(12) United States Patent
Inoue et al.

(10) Patent No.: US 8,773,520 B2
(45) Date of Patent: Jul. 8, 2014

(54) CONTROL DEVICE, CONTROL PROGRAM, AND CONTROL METHOD FOR OBSERVATION UNIT, AND OBSERVATION SYSTEM

(75) Inventors: Takahiro Inoue, Hirakata (JP);
Yoshitaro Yamanaka, Ibaraki (JP)

(73) Assignee: Panasonic Healthcare Co., Ltd., Toon-Shi (JP)

( * ) Notice: Subject to any disclaimer, the term of this patent is extended or adjusted under 35 U.S.C. 154(b) by 711 days.

(21) Appl. No.: 12/986,059

(22) Filed: Jan. 6, 2011

(65) Prior Publication Data

US 2011/0164125 A1 Jul. 7, 2011

(30) Foreign Application Priority Data

Jan. 7, 2010 (JP) ................. 2010-001662

(51) Int. Cl.
*H04N 7/18* (2006.01)
(52) U.S. Cl.
USPC ............................................................ 348/61
(58) Field of Classification Search
USPC .................. 382/133; 378/44; 359/88, 368
See application file for complete search history.

(56) References Cited

U.S. PATENT DOCUMENTS

| 6,711,283 | B1 * | 3/2004 | Soenksen | 382/133 |
|---|---|---|---|---|
| 2001/0030802 | A1 | 10/2001 | Ooki et al. | |
| 2006/0210262 | A1 | 9/2006 | Fujiyoshi et al. | |
| 2007/0058246 | A1 * | 3/2007 | Westphal et al. | 359/368 |
| 2008/0304147 | A1 * | 12/2008 | Kawanabe et al. | 359/388 |
| 2010/0002833 | A1 * | 1/2010 | Matoba et al. | 378/44 |

FOREIGN PATENT DOCUMENTS

| EP | 1 764 640 A2 | 3/2007 |
|---|---|---|
| EP | 2 000 842 A1 | 12/2008 |
| JP | 2007-102190 A | 4/2007 |
| JP | 2009-025349 A | 2/2009 |
| WO | WO-2007/142339 A1 | 12/2007 |

OTHER PUBLICATIONS

Extended European Search Report dated Mar. 7, 2012.
English Abstract and Translation for JP 2007-102190 A, published Apr. 19, 2007.
English Abstract and Translation for JP 2009-025349 A, published Feb. 5, 2009.
Office Action dated Jul. 2, 2013 for corresponding Japanese application No. JP 2010-001662.

\* cited by examiner

*Primary Examiner* — Dave Czekaj
*Assistant Examiner* — Leron Beck
(74) *Attorney, Agent, or Firm* — NDQ&M Watchstone LLP

(57) ABSTRACT

Provided is a control device for controlling an observation unit including an observation device for allowing a sample to be observed to acquire an observation image of the sample and an illumination device for illuminating the sample when the sample is observed with the observation device, the control device including a first control unit for controlling the illumination device to adjust an illuminance of the illumination device when a search mode is set for the observation unit, and a second control unit for controlling the illumination device to adjust the illuminance of the illumination device when a time lapse mode is set for the observation unit. Here, the illuminance set for the illumination device by the first control unit by adjusting the illuminance of the illumination device is lower than the illuminance set for the illumination device by the second control unit by adjusting the illuminance of the illumination device.

12 Claims, 13 Drawing Sheets

CONTROL DEVICE, CONTROL PROGRAM, AND CONTROL METHOD FOR OBSERVATION UNIT, AND OBSERVATION SYSTEM

This patent application claims priority based on Japanese Patent Application No. 2010-1662, the contents of which are hereby incorporated in their entirety by this reference into the present application.

BACKGROUND OF THE INVENTION

1. Field of the Invention

The present invention relates to a control device, a control program, and a control method for an observation unit configured to allow samples such as cells to be observed, as well as an observation system.

2. Description of the Related Art

An observation unit of this type includes an observation device configured to enable a sample to be observed to acquire an observation image of the sample, and an illumination device configured to illuminate the sample when the sample is observed with the observation device. Furthermore, the following modes can be selectively set for the observation unit: a search mode for searching for one or more samples for which observation images are to be acquired by an observation device, and an observation mode (hereinafter referred to as a time lapse mode) for using the observation device to repeatedly observe one or more samples for which observation images are to be acquired and acquiring observation images of the samples during each observation.

Here, in the search mode, a user uses the observation device to search for and determine the one or more samples for which observation images are to be acquired. Then, varying sample information for each of the determined samples (for example, the position of the sample, a zoom factor, and a focus position) is recorded in a memory. Furthermore, in the time lapse mode, the one or more samples for which observation images are to be acquired are observed based on the sample information recorded in the memory.

In the aforementioned example of the observation unit, the observation unit is first set to the search mode, and a macro image is acquired which is an observation image of all the samples obtained at a low zoom factor. The user uses the macro image to search for and determine one or more samples for which observation images are to be acquired. Thus, the sample information on the determined samples is recorded in the memory.

Thereafter, the observation unit is set to the time lapse mode. Based on the sample information recorded in the memory, the samples determined by the user are periodically and repeatedly observed with the observation device, with observation images of the samples acquired.

The thus acquired observation images of the samples can be utilized to observe and analyze the culture condition of the samples.

However, regardless of whether the observation unit is set to the search mode or the time lapse mode, during observation, the sample is illuminated by an illumination device in order to enable the observation. Thus, radiation from the illumination device causes heat to be transmitted to the sample. As a result, the temperature of the sample may increase. Furthermore, the observation unit is equipped with, besides the illumination device, a camera, motors, and the like, which serve as heat sources. Hence, the illumination device and conductive heat from these heat sources may increase the temperature of the sample. The increased temperature of the sample is likely to affect the sample, for example, to kill the sample.

Control has been proposed in which in order to reduce the adverse effects of photobleaching and phototoxicity on samples such as cells, the illumination device performs an illumination operation only during a part of an observation period for the samples in which the camera performs an image pickup operation. Such control may be also effective when an increase in the temperature of the sample is to be suppressed provided that the control is applied to an observation unit configured to acquire macro images when the search mode is set.

However, the situation to which the control is applicable is limited. If the control is used in various situations, heat from the illumination device may increase the temperature of the sample. Furthermore, the control fails to deal with conductive heat from the heat source.

SUMMARY OF THE INVENTION

Thus, an object of the present invention is to provide a control device, a control program, and a control method which enable a reduction in the adverse effect, on a sample, of conductive heat from a heat source such as an illumination device in an observation unit, as well as an observation system.

The present invention provides a control device 7 configured to control an observation unit 100 including an observation device 5 configured to allow a sample to be observed to acquire an observation image of the sample and an illumination device 6 configured to illuminate the sample when the sample is observed with the observation device 5, the control device 7 including a first control unit 71 configured to control the illumination device 6 so as to adjust an illuminance of the illumination device 6 when for the observation unit 100, a search mode is set in which the observation device 5 is used to search for and determine one or more samples for which observation images are to be acquired by the observation device 5 and in which varying sample information for each of the determined samples is recorded in a memory 70, and a second control unit 72 configured to control the illumination device 6 so as to adjust the illuminance of the illumination device 6 when for the observation unit 100, an observation mode is set in which the observation device 5 is used to observe the one or more samples for which observation images are to be acquired, to acquire observation images of the samples, based on the sample information recorded in the memory 70. Here, the illuminance set for the illumination device 6 by the first control unit 71 by adjusting the illuminance of the illumination device 6 is lower than the illuminance set for the illumination device 6 by the second control unit 72 by adjusting the illuminance of the illumination device 6.

The aforementioned control device controls the observation unit 100 in such a manner that when the search mode is set, the sample is searched for at an illuminance lower than that set for the illumination device 6 when the observation mode is set. Thus, the amounts of radiation and heat conduction from the illumination device 6 in conjunction with an illumination operation of the illumination device 6 decrease when the sample is searched for. Hence, at least when the sample is searched for, a reduced amount of heat is conducted from the illumination device 6 to the sample. This serves to suppress an increase in the temperature of the sample. As a result, the adverse effect of heat on the sample is reduced.

In the specific configuration of the aforementioned control device, a predetermined illuminance to be set for the illumination device 6 when the observation mode is set for the observation unit 100 is recorded in the memory 70. When the observation mode is set for the observation unit 100, the second control unit 72 adjusts and sets the illuminance of the illumination device 6 to the predetermined value recorded in the memory 70.

When the control device specifically configured as described above controls the observation unit 100, the illuminance of the illumination device 6 is set to the predetermined value. Thus, in a configuration in which the observation device 5 includes an image pickup unit 54 with a variable shutter speed, the luminance of an observation image of the sample acquired by the image pickup unit 54 can be adjusted to a value within a predetermined range by adjusting only one of the illuminance and the shutter speed, that is, the shutter speed.

Hence, in particular, if a time required to adjust the shutter speed of the image pickup unit 54 is shorter than a time required to adjust the illuminance of the illumination device 6, a time is reduced which is required to adjust the luminance of an observation image of the sample acquired by the image pickup unit 54. Thus, observing the sample with the observation mode set for the observation unit allows a reduction in a time for which the sample is illuminated by the illumination device 6 and in a period for which the image pickup unit 54 is electronically continuous. This serves to reduce the amount of conductive heat from the illumination device 6 and the image pickup unit 54 to the sample, and thus suppresses an increase in the temperature of the sample. As a result, the adverse effect of heat on the sample is reduced.

In another specific configuration of the aforementioned control device, the illuminance set for the illumination device 6 when the search mode is set for the observation unit 100 is recorded in the memory 70. When the observation mode is set for the observation unit 100, the second control unit 72 performs a calculation operation of multiplying the illuminance recorded in the memory 70 by a predetermined number larger than 1. Thereafter, the second control unit 72 adjusts and sets the illuminance of the illumination device 6 to an illuminance calculated by performing the calculation operation.

If the sample is cells or microorganisms, the sample is cultured and thus grows or multiplies. Thus, when the sample is observed with the observation mode set for the observation unit at the same illuminance as that set for the illumination device 6 when the search mode is set, the luminance of observation images may decrease.

In contrast, when the control device with the aforementioned specific configuration controls the observation unit 100, the illuminance set for the illumination device 6 when the observation mode is set is higher than that set for the illumination device 6 when the search mode is set. Hence, a possible decease in the luminance of observation images is prevented even if the sample grows or multiplies after the sample has been searched for with the search mode set for the observation unit and before the sample is observed with the observation mode set for the observation unit.

Furthermore, the control device with the aforementioned specific configuration allows the illuminance of the illumination device 6 to be maintained at the minimum required value when the sample is observed with the observation mode set for the observation unit. This enables suppression of a possible increase in the amount of radiation heat and conductive heat transmitted from the illumination device 6 to the sample.

In another specific configuration of the aforementioned control device, the observation device 5 includes a zoom unit 53 configured to enlarge observation images of the samples. A zoom factor to be set for the zoom unit 53 when the observation mode is set for the observation unit 100 is recorded in the memory 70 as the sample information. When the observation mode is set for the observation unit 100, the second control unit 72 performs a calculation operation of calculating the illuminance to be set for the illumination device 6 based on the zoom factor recorded in the memory 70. Thereafter, the second control unit 72 adjusts and sets the illuminance of the illumination device 6 to the value calculated by performing the calculation operation.

If the sample is observed at the same illuminance but at different zoom factors, an observation image with a large zoom factor has a lower luminance than an observation image with a small zoom factor. This results in a variation in luminance among observation images.

In contrast, when the control device with the aforementioned specific configuration controls the observation unit 100, with the observation mode set for the observation unit, the illuminance is set to the value calculated based on the zoom factor. Thus, even if the zoom factor varies depending on the sample to be observed, a variation in luminance among observation images can be reduced.

Furthermore, the control device with the aforementioned specific configuration allows the illuminance of the illumination device 6 to be maintained at the minimum required value when the sample is observed with the observation mode set for the observation unit. This enables suppression of a possible increase in the amount of radiation heat and conductive heat transmitted from the illumination device 6 to the sample.

In another specific configuration of the aforementioned control device, the observation device 5 includes an image pickup unit 54 with a variable shutter speed, and the control device 7 further includes a third control unit configured to control the image pickup unit 54 to adjust the shutter speed of the image pickup unit 54. Here, a predetermined shutter speed to be set for the image pickup unit 54 when the search mode is set for the observation unit 100 is recorded in the memory 70. When the search mode is set for the observation unit 100, the third control unit adjusts and sets the shutter speed of the image pickup unit 54 to the predetermined shutter speed recorded in the memory 70.

An observation system according to the present invention includes an observation unit 100 configured to allow a sample to be observed and a control device 7 configured to control the observation unit 100. The observation unit 100 includes an observation device 5 configured to allow the sample to be observed to acquire an observation image of the sample and an illumination device 6 configured to illuminate the sample when the sample is observed with the observation device 5. The control device 7 includes a first control unit 71 configured to control the illumination device 6 so as to adjust an illuminance of the illumination device 6 when for the observation unit 100, a search mode is set in which the observation device 5 is used to search for and determine one or more samples for which observation images are to be acquired by the observation device 5 and in which varying sample information for each of the determined samples is recorded in a memory 70, and a second control unit 72 configured to control the illumination device 6 so as to adjust the illuminance of the illumination device 6 when for the observation unit 100, an observation mode is set in which the observation device 5 is used to observe the one or more samples for which observation images are to be acquired, to acquire observation images of the samples, based on the sample information recorded in the memory 70. Here, the illuminance set for the illumination device 6 by the first control unit 71 by adjusting the illuminance of the illumination device 6 is lower than the illuminance set for the illumination device 6 by the second control unit 72 by adjusting the illuminance of the illumination device 6.

The present invention provides a control program for controlling an observation unit 100 including an observation device 5 configured to allow a sample to be observed to acquire an observation image of the sample and an illumination device 6 configured to illuminate the sample when the sample is observed with the observation device 5, the control program allowing a computer 103 to execute a first control step (steps S44 and S45) of controlling the illumination device 6 so as to adjust an illuminance of the illumination device 6 when for the observation unit 100, a search mode is set in which the observation device 5 is used to search for and determine one or more samples for which observation images are to be acquired by the observation device 5 and in which varying sample information for each of the determined samples is recorded in a memory 70, and a second control step (steps S21 and S22) of controlling the illumination device 6 so as to adjust the illuminance of the illumination device 6 when for the observation unit 100, an observation mode is set in which the observation device 5 is used to observe the one or more samples for which observation images are to be acquired, to acquire observation images of the samples, based on the sample information recorded in the memory 70, wherein the illuminance set for the illumination device 6 in the first control step by adjusting the illuminance of the illumination device 6 is set to be lower than the illuminance set for the illumination device 6 in the second control step by adjusting the illuminance of the illumination device 6.

The present invention provides a control method for controlling an observation unit 100 including an observation device 5 configured to allow a sample to be observed to acquire an observation image of the sample and an illumination device 6 configured to illuminate the sample when the sample is observed with the observation device 5, the control method including a first control step (steps S44 and S45) of controlling the illumination device 6 so as to adjust an illuminance of the illumination device 6 when for the observation unit 100, a search mode is set in which the observation device 5 is used to search for and determine one or more samples for which observation images are to be acquired by the observation device 5 and in which varying sample information for each of the determined samples is recorded in a memory 70, and a second control step (steps S21 and S22) of controlling the illumination device 6 so as to adjust the illuminance of the illumination device 6 when for the observation unit 100, an observation mode is set in which the observation device 5 is used to observe the one or more samples for which observation images are to be acquired, to acquire observation images of the samples, based on the sample information recorded in the memory 70, wherein the illuminance set for the illumination device 6 in the first control step by adjusting the illuminance of the illumination device 6 is set to be lower than the illuminance set for the illumination device 6 in the second control step by adjusting the illuminance of the illumination device 6.

As described above, the control device, control program, and control method as well as observation system according to the present invention enable a reduction in the adverse effect, on the sample, of conductive heat from a heat source such as the illumination device in the observation unit.

DETAILED DESCRIPTION OF THE PREFERRED EMBODIMENTS

Embodiments of the present invention will be specifically described below with reference to the drawings.

1. Observation System

Figure 1:
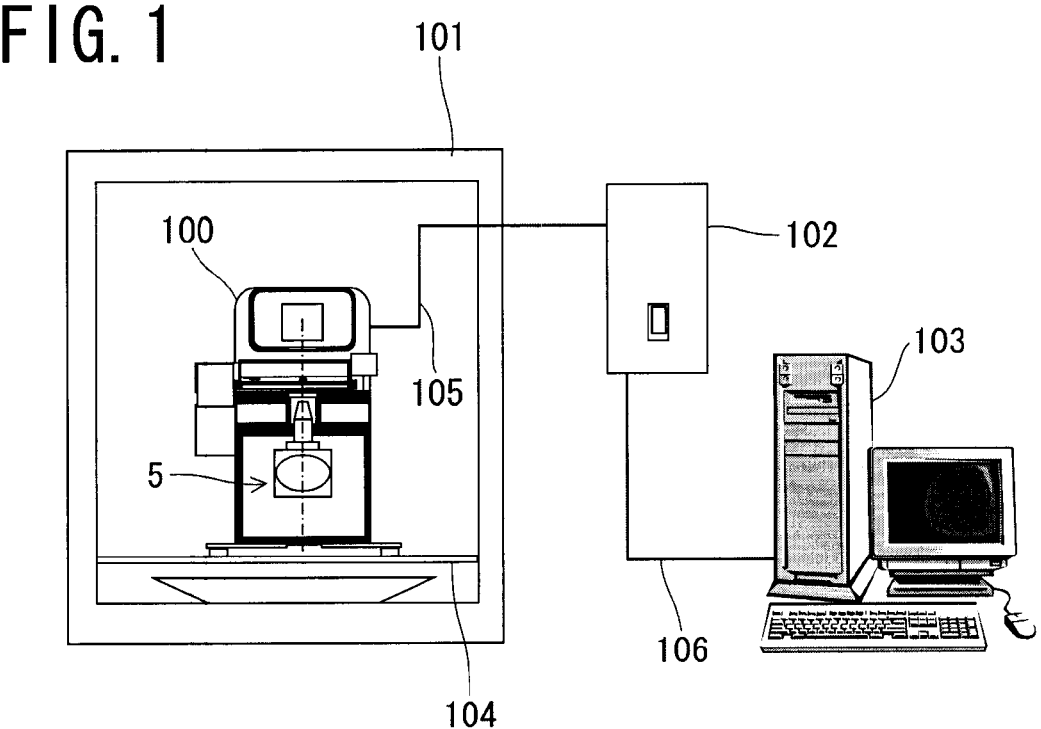
FIG. 1 is a diagram illustrating an observation system according to an embodiment of the present invention.

FIG. 1 is a diagram illustrating an observation system according to an embodiment of the present invention. As illustrated in FIG. 1, the observation system includes an observation unit 100, a relay control unit 102, and a personal computer 103.

The observation unit 100 can be installed in a storage 101 in which samples such as cells are cultured or stored. An incubator, an isolator, or the like may be adopted as the storage 101; the incubator can set the environment in the storage 101 to be suitable for culturing of the samples, and the isolator can keep the environment in the storage 101 sterile. The observation unit 100 will be described below in detail.

A shelf 104 is provided inside the storage 101. The observation unit 100 is installed on the shelf 104 for use. Only one shelf 104 is provided in the storage 101 illustrated in FIG. 1. However, a plurality of shelves may be provided in the storage 101. In the storage 101, a plurality of containers may be placed on the plurality of shelves. A sample may be accommodated in each of the containers and cultured and stored therein.

The observation unit 100 is connected to the relay control unit 102 installed outside the storage 101, by a cable 105 drawn out of the observation unit 100. Furthermore, the relay control unit 102 is connected to the personal computer 103 installed outside the storage 101, by a cable 106 drawn out of the relay control unit 102. The relay control unit 102 and the personal computer 103 will be described below in detail.

2. Observation Unit 2-1. Configuration of the Observation Unit

Figure 2:
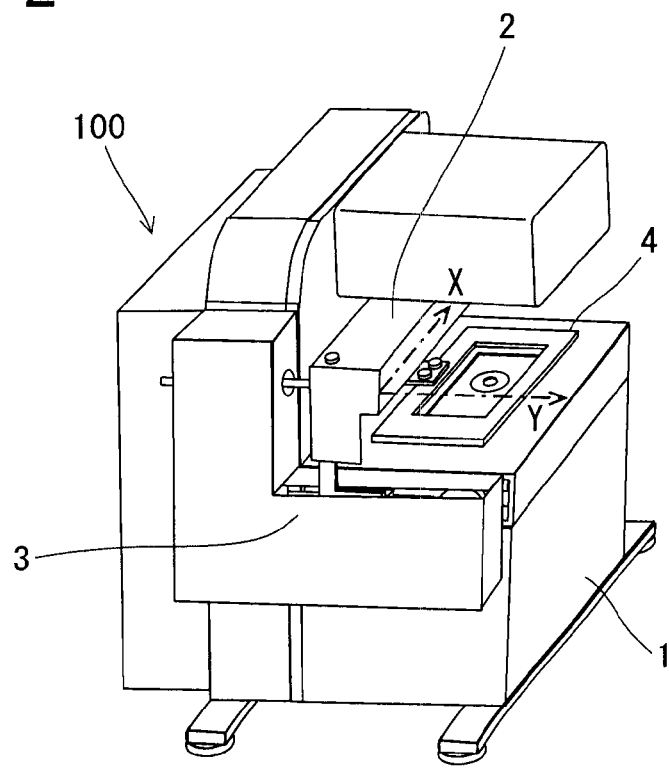
FIG. 2 is a perspective view illustrating the appearance of an observation unit included in the observation system.
Figure 3:
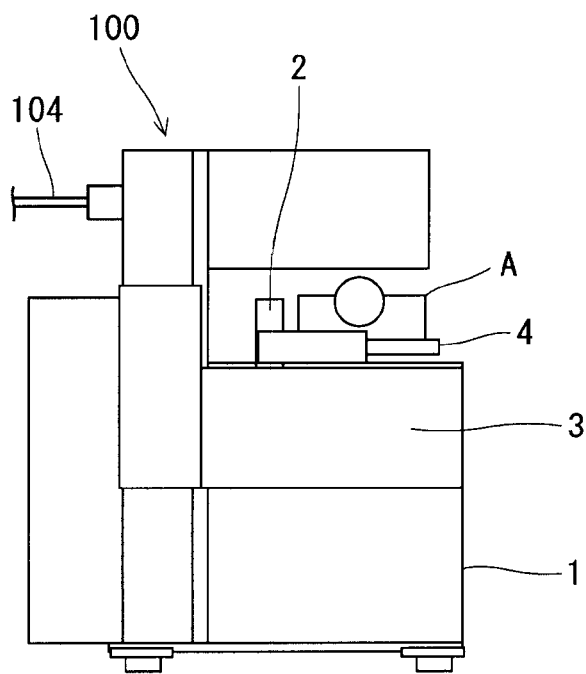
FIG. 3 is a side view of the observation unit.
Figure 4:
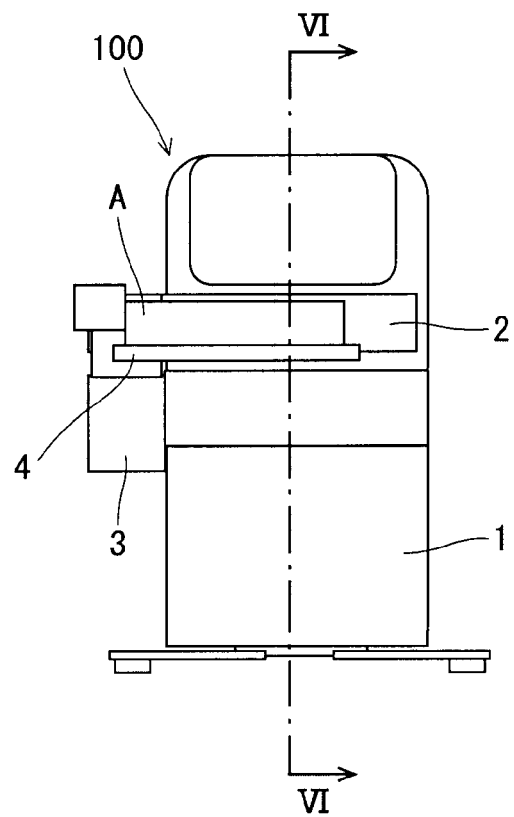
FIG. 4 is a front view of the observation unit.

FIG. 2 is a perspective view illustrating the appearance of the observation unit 100. FIG. 3 and FIG. 4 are a side view and a front view, respectively, illustrating the observation unit 100. Furthermore, FIG. 5 is a sectional view taken along line VI-VI illustrated in FIG. 4.

As illustrated in FIG. 2 to FIG. 5, the observation unit 100 includes a loading table 4 on which a container A with a sample accommodated therein is to be loaded, an X axis driving unit 2 configured to move the loading table 4 along an X axis direction, a Y axis driving unit 3 configured to move the loading table 4 along a Y axis direction, an observation device 5 configured to allow the sample in the container A to be observed to acquire an observation image of the sample, an illumination device 6 configured to illuminate the sample when the sample is observed with the observation device 5, a Z axis motor 56 configured to move the observation device 5 along a Z axis direction, and a housing 1 in which the components 4, 2, 3, 5, 6, and 56 are arranged. The X and Y axis directions are two directions orthogonal to each other in a horizontal plane. The Z axis direction is a vertical direction.

Figure 5:
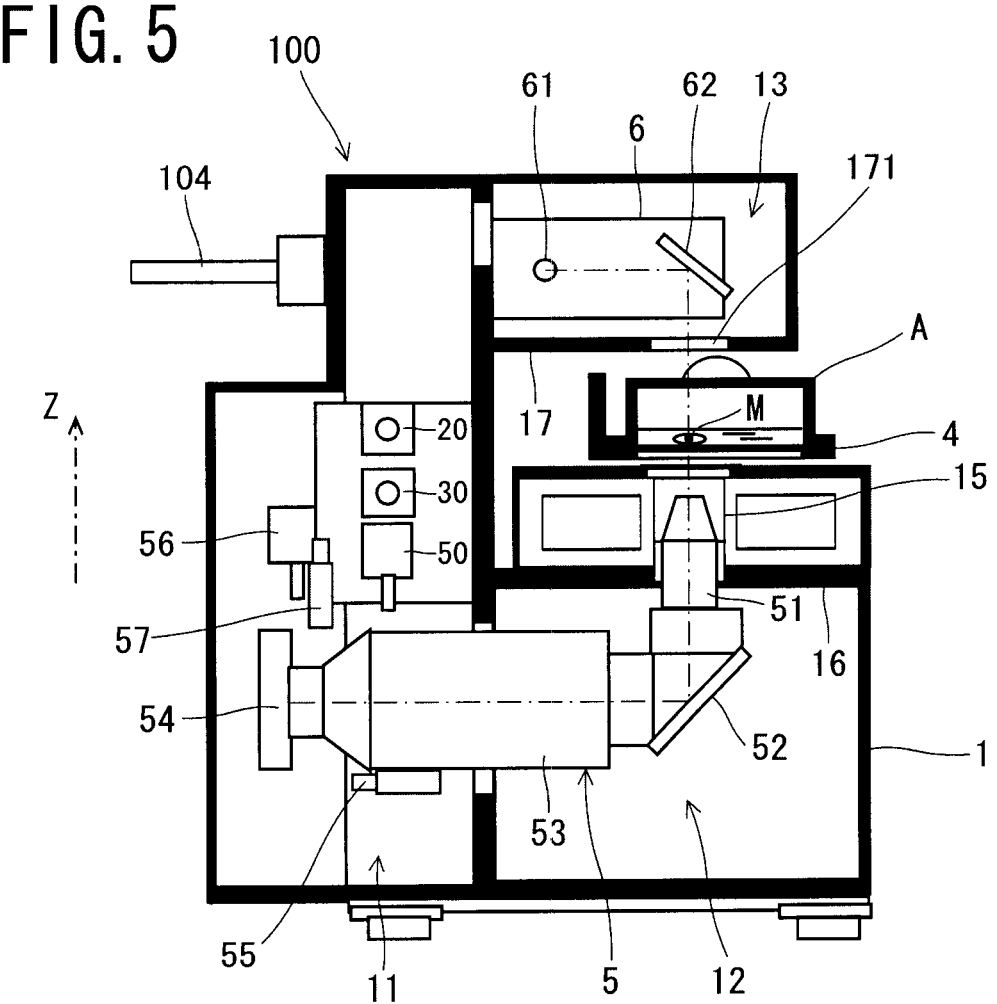
FIG. 5 is a sectional view taken along line VI-VI illustrated in FIG. 4.

Here, as illustrated in FIG. 5, a space inside the housing 1 includes a first space 11 extending substantially in the vertical direction at a position located away from the loading table 4 in a horizontal direction, a second space 12 positioned below the loading table 4, and a third space 13 positioned above the loading table 4.

<X Axis Driving Unit and Y Axis Driving Unit>

Figure 6:
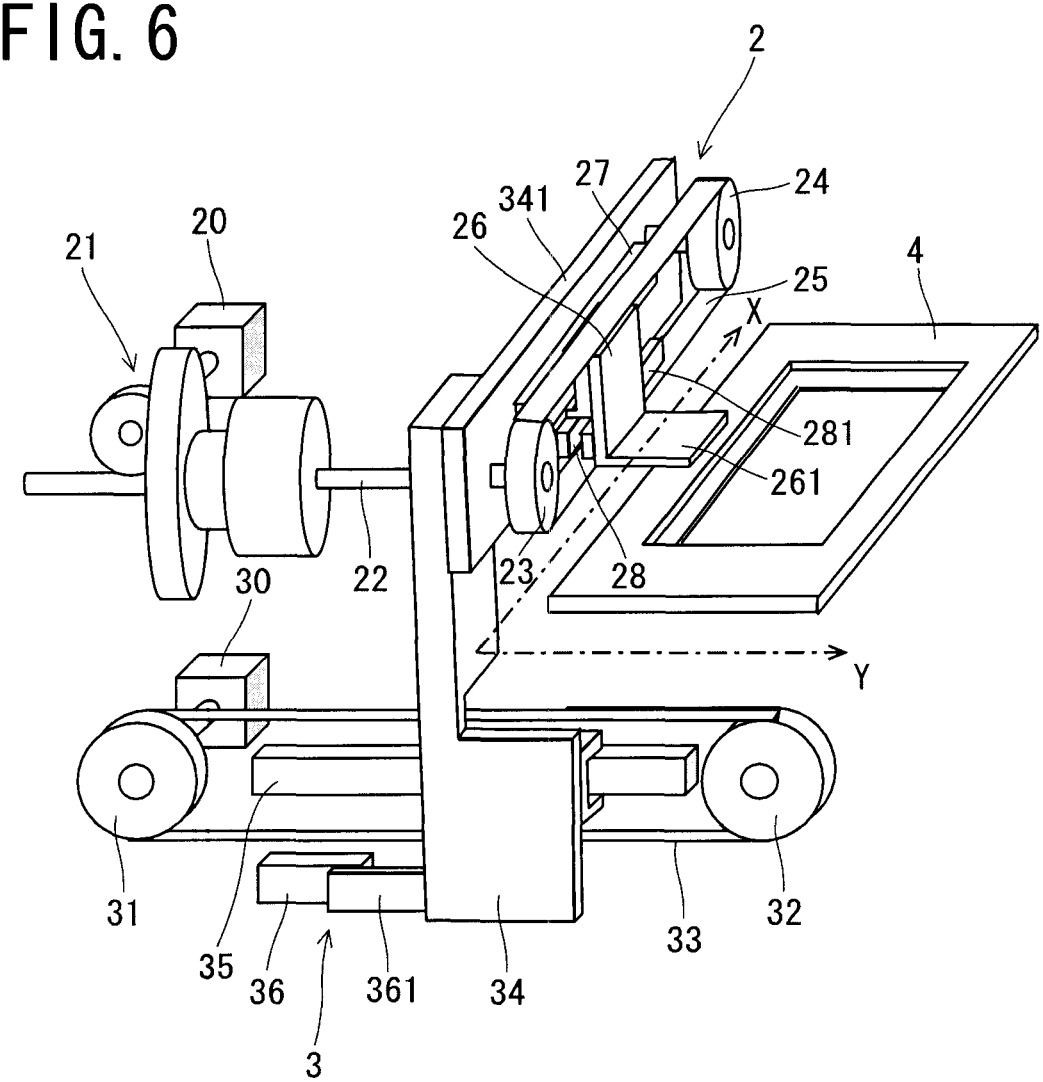
FIG. 6 is a perspective view illustrating an X axis driving unit and a Y axis driving unit both provided in the observation unit.
Figure 7:
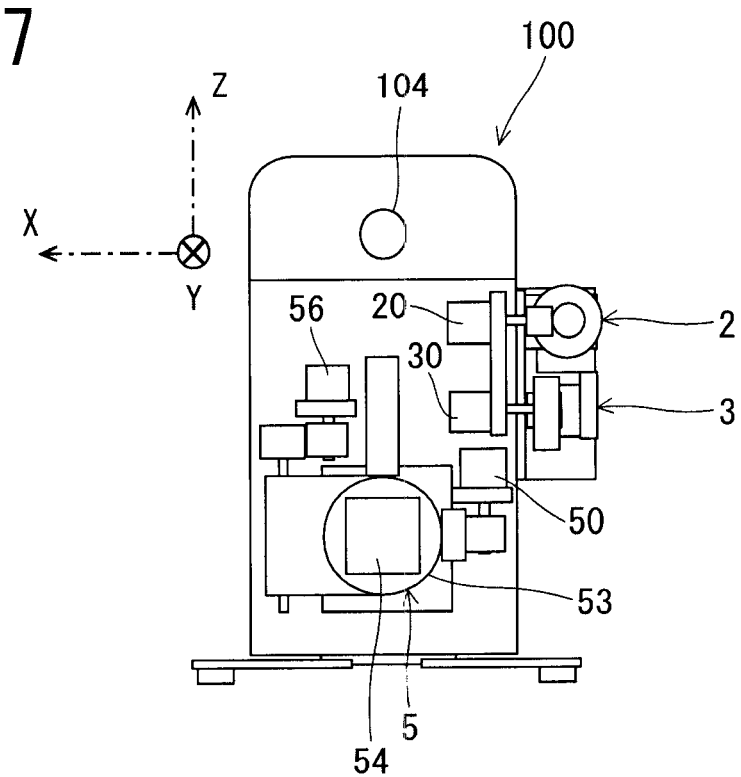
FIG. 7 is a rear view illustrating the observation unit with a rear wall of a housing thereof omitted.

FIG. 6 is a perspective view illustrating the X axis driving unit 2 and the Y axis driving unit 3. Furthermore, FIG. 7 is a rear view illustrating the observation unit 100 with a rear wall of the housing 1 thereof omitted. First, one of the two driving units 2 and 3, that is, the Y axis driving unit 3, will be described.

The Y axis driving unit 3 includes a Y axis motor 30, paired pulleys 31 and 32, a timing belt 33, an inverted L-shaped Y axis slide unit 34, and a guide member 35. Here, the Y axis motor 30, included in the Y axis driving unit 3, is installed in the first space 11 in the housing 1 and includes a rotating shaft directed along the X axis, as illustrated in FIG. 5 and FIG. 7. Furthermore, a stepping motor is adopted as the Y axis motor 30.

The pulley 31, one of the paired pulleys 31 and 32, is fixed to the rotating shaft of the Y axis motor 30. As the Y axis motor 30 rotates, the pulley 31 rotates around the center axis of rotation of the Y axis motor 30. The other pulley 32 is rotatably installed at a position located away from the pulley 31 along the Y axis direction.

The timing belt 33 is passed around the paired pulleys 31 and 32. The Y axis slide unit 34 is coupled to the timing belt 33 in the area between the paired pulleys 31 and 32. Furthermore, an upper side portion 341 of the Y axis slide unit 34 extends, along the X axis direction, through the space in which the loading table 4 is located.

The guide member 35 extends between the paired pulleys 31 and 32 along the Y axis direction. The Y axis slide unit 34 is slidably coupled to the guide member 35. Thus, a direction in which the Y axis slide unit 34 can be moved is defined along the Y axis direction.

In the Y axis driving unit 3, the pulley 31 rotates to rotate and move the timing belt 33 between the paired pulleys 31 and 32 along the Y axis direction. Thus, rotational movement of the pulley 31 is converted into translational motion along the Y axis direction by the timing belt 33.

Hence, the Y axis driving unit 3 converts the rotational force of the Y axis motor 30 into a translational force along the Y axis direction. The Y axis driving unit 3 then applies the translational force to the Y axis slide unit 34. As a result, the Y axis slide unit 34 moves along the Y axis direction.

The X axis driving unit 2 includes an X axis motor 20, a gear mechanism 21, a shaft 22 extending in the Y axis direction, paired pulleys 23 and 24, a timing belt 25, an L-shaped X axis slide unit 26, and a guide member 27. Here, the X axis motor 20, included in the X axis driving unit 2, is installed in the first space 11 in the housing 1 and includes a rotating shaft directed along the X axis, as illustrated in FIG. 5 and FIG. 7. Furthermore, a stepping motor is adopted as the X axis motor 20.

The gear mechanism 21 converts the rotational force of the X axis motor 20 into a rotational force exerted around the center axis of the shaft 22. The gear mechanism 21 then applies the rotational force to the shaft 22. The shaft 22 is rotatably supported by the upper side portion 341 of the Y axis slide unit 34 of the Y axis driving unit 3. The shaft 22 can slide with respect to the gear mechanism 21.

The pulley 23, one of the paired pulleys 23 and 24, is fixed to one end of the shaft 22. As the shaft 22 rotates, the pulley 23 rotates around the same axis as that around which the shaft 22 rotates. The other pulley 24 is rotatably installed on the upper side portion 341 of the Y axis slide unit 34 at a position located away from the pulley 23 along the X axis direction.

The timing belt 25 is passed around the paired pulleys 23 and 24. The X axis slide unit 26 is coupled to the timing belt 25 in the area between the paired pulleys 23 and 24. Furthermore, the loading table 4 is fixed to a lower side portion 261 of the X axis slide unit 26.

The guide member 27 extends between the paired pulleys 23 and 24 along the X axis direction. The X axis slide unit 26 is slidably coupled to the guide member 27. Thus, a direction in which the X axis slide unit 26 can be moved is defined along the X axis direction, In the X axis driving unit 2, the pulley 23 rotates to rotate and move the timing belt 25 between the paired pulleys 23 and 24 along the X axis direction. Thus, rotational movement of the pulley 23 is converted into translational motion along the X axis direction by the timing belt 25.

Consequently, the rotational force of the X axis motor 20 is converted by the X axis driving unit 2 into a translational force acting in the X axis direction. Then, the translational force is applied to the X axis slide unit 26 by the X axis driving unit 2. As a result, the X axis slide unit 26 moves along the X axis direction.

Hence, the X axis driving unit 2 converts the rotational force of the X axis motor 20 into the translational force acting along the X axis direction, and applies the translational force to the X axis slide unit 26. As a result, the X axis slide unit 26 moves along the X axis direction.

Thus, the loading table 4 fixed to the X axis slide unit 26 moves along the X axis direction by rotation of the X axis motor 20 and along the Y axis direction by rotation of the Y axis motor 30. Therefore, the loading table 4 can be moved to various positions in an XY coordinate system by independently controlling the rotating operations of the X axis motor 20 and the Y axis motor 30.

<Origin Sensor>

As illustrated in FIG. 6, the X axis driving unit 2 further includes an X axis origin sensor 28. The Y axis driving unit 3 further includes a Y axis origin sensor 36.

The X axis origin sensor 28 is switched on and off when a sensing target plate 281 fixed to the X axis slide unit 26 approaches and leaves the X axis origin sensor 28. Here, the X axis origin sensor 28 is installed such that when the X axis origin sensor 28 is switched on, the position of the loading table 4 coincides with the origin of the X axis.

The Y axis origin sensor 36 is switched on and off when a sensing target plate 361 fixed to the Y axis slide unit 34 approaches and leaves the Y axis origin sensor 36. Here, the Y axis origin sensor 36 is installed such that when the Y axis origin sensor 36 is switched on, the position of the loading table 4 coincides with the origin of the Y axis.

The X axis origin sensor 28 and the Y axis origin sensor 36 allow the loading table 4 to return to the origin from any position within a movable range located away from the origin of the XY coordinate system.

<Illumination Device>

As illustrated in FIG. 5, the illumination device 6 is installed in the third space 13 in the housing 1. The illumination device 6 includes an LED (Light Emitting Diode) 61 configured to emit light and a reflection mirror 62 configured to reflect the light emitted by the LED 61 vertically downward.

A bottom surface wall 17 forming the third space 13 in the housing 1 includes a light transmission portion 171 formed below the reflection mirror 62. Thus, the light reflected by the reflection mirror 62 is transmitted through the light transmission portion 171 and downward through a space in which the loading table 4 is located.

Here, in the space in which the loading table 4 is located, an observation point M for a sample is set at the position where the light reflected by the reflection mirror 62 passes through. Hence, in the observation unit 100, the sample located at the observation point M can be illuminated by the illumination device 6.

<Observation Device>

The observation device 5 is a phase difference microscope. As illustrated in FIG. 5, the observation device 5 includes an objective lens 51 configured to form an enlarged image of a sample to be observed, a reflection mirror 52 configured to guide the enlarged image formed by the objective lens 51, to a zoom lens 53, the zoom lens 53 configured to further enlarge the enlarged image of the sample, a CCD (Charge Coupled Device) camera 54 configured to pick up an image of the enlarged image enlarged by the zoom lens 53 to acquire an observation image of the sample, and a driving motor 50 configured to drive the zoom lens 53 to change the zoom in factor of the zoom lens 53. Here, the CCD camera 54 has a variable shutter speed.

As illustrated in FIG. 5 and FIG. 7, the CCD camera 54 and driving motor 50, included in the observation device 5, are installed in the first space 11 in the housing 1. The objective lens 51 and reflection mirror 52, also included in the observation device 5, are installed in the second space 12 in the housing 1 as illustrated in FIG. 5. Furthermore, the zoom lens 53 is installed across both the first space 11 and the second space 12. The objective lens 51 is located below the observation point M.

A light transmission portion 15 is formed below the observation point M and in a top surface wall 16 forming the second space 12 in the housing 1. Thus, after passing through the observation point M, the light reflected by the reflection mirror 62 in the illumination device 6 is transmitted through the light transmission portion 15 and then enters the objective lens 51 in the observation device 5. Hence, the observation unit 100 can allow the sample to be observed with the observation device 5 to acquire an observation image of the sample, while illuminating the sample using the illumination device 6.

As illustrated in FIG. 5, the zoom factor with which the observation device 5 allows the sample to be observed is determined by the zoom in factors of the objective lens 51 and the zoom lens 53. The observation zoom factor for the sample is changed by allowing the driving motor 50 to drive the zoom lens 53 to change the zoom in factor of the zoom lens 53.

When the sample is observed with the observation device 5, focusing is carried out by using the Z axis motor 56 to move the observation device 5 along the Z axis direction. The Z axis motor 56 is installed in the first space 11 in the housing 1 as illustrated in FIG. 5 and FIG. 7.

As illustrated in FIG. 5, the observation device 5 further includes a zooming origin sensor 55. The zooming origin sensor 55 is switched on and off when a sensing target plate (not illustrated in the drawings) fixed to the zoom lens 53 approaches and leaves the zooming origin sensor 55. Here, the zooming origin sensor 55 is installed such that when the zooming origin sensor 55 is switched on, the position of the zoom lens 53 coincides with a predetermined position.

The zooming origin sensor 55 allows the zoom lens 53 to return to the predetermined position from any position within the movable range located away from the predetermined position.

As illustrated in FIG. 5, a Z axis origin sensor 57 is further installed in the first space 11 in the housing 1. The Z axis origin sensor 57 is switched on and off when a sensing target plate (not illustrated in the drawings) fixed to the observation device 5 approaches and leaves the Z axis origin sensor 57. Here, the Z axis origin sensor 57 is installed such that when the Z axis origin sensor 57 is switched on, the position of the observation device 5 coincides with the origin of the Z axis.

The Z axis origin sensor 57 allows the observation device 5 to return to the origin in the Z axis direction from any position within the movable range located away from the origin.

2-2. Heat Source

In the observation unit 100, if the LED 61 of the illumination device 6 is allowed to emit light to illuminate the sample, radiation and heat conduction from the illumination device 6 transmits heat to the container A loaded on the loading table 4 and thus to the sample in the container A.

Furthermore, the motors (X axis motor 20, Y axis motor 30, Z axis motor 56, and driving motor 50) and origin sensors (X axis origin sensor 28, Y axis origin sensor 36, Z axis origin sensor 57, and zooming origin sensor 55) and the CCD camera 54 all generate heat when electrically continuous. The heat generated by the motors, the origin sensors, and the CCD camera 54 conducts through the observation unit 100. The heat is then transmitted to the container A loaded on the loading table 4 and thus to the sample in the container A.

Hence, in the observation unit 100, the illumination device 6, the motors, the origin sensors, and the CCD camera 54 serve as heat sources to transmit heat to the container A loaded on the loading table 4 and thus to the sample in the container A. Furthermore, if the sample is cells or the like and a culture solution in which the sample is cultured is accommodated in the container A, the heat is also transmitted to the culture solution.

When a large amount of heat is transmitted to the sample during the observation of the sample, the sample is likely to be affected, for example, to be killed.

2-3. Search Mode and Time Lapse Mode

Two modes for observing the sample using the observation unit 100 are prepared for the observation unit 100. The two modes can be selectively set for the observation unit 100.

Figure 9:
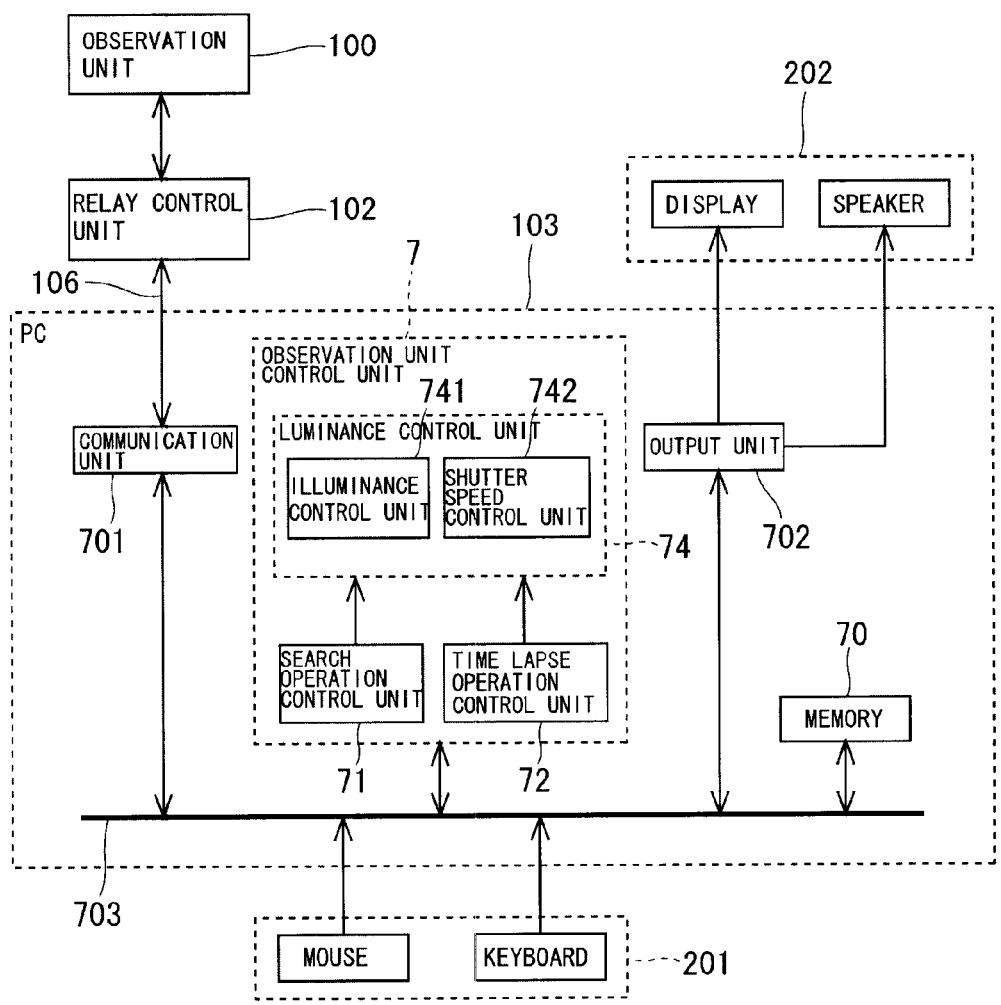
FIG. 9 is a block diagram illustrating the configuration of a personal computer included in the observation system.

Here, one of the two modes is a search mode in which the user uses the observation device 5 to search for and determine one or more samples for which observation images are to be acquired by the observation device 5 and in which varying sample information for each of the determined samples (for example, the position (coordinates) of the sample, the zoom factor, and a focus position) is recorded in the memory 70 (see FIG. 9). An observation operation performed by the observation unit 100 to set the search mode is hereinafter referred to as a "search operation".

The other of the two modes is an observation mode in which the one or more samples for which observation images are to be acquired are repeatedly observed with the observation device 5 and in which observation images of the samples are acquired during each observation, based on the sample information recorded in the memory 70. The observation mode is hereinafter referred to as a "time lapse mode". An observation operation performed by the observation unit 100 to set the time lapse mode is hereinafter referred to as a "time lapse operation".

The time lapse operation is performed based on, besides the sample information, set information preset by the user. Here, the set information includes a list of observation points on which the time lapse operation is performed, a start time and an end time for the time lapse operation, a time lapse period, and a location at which each observation image is stored.

3. Configuration of the Relay Control Unit

Figure 8:
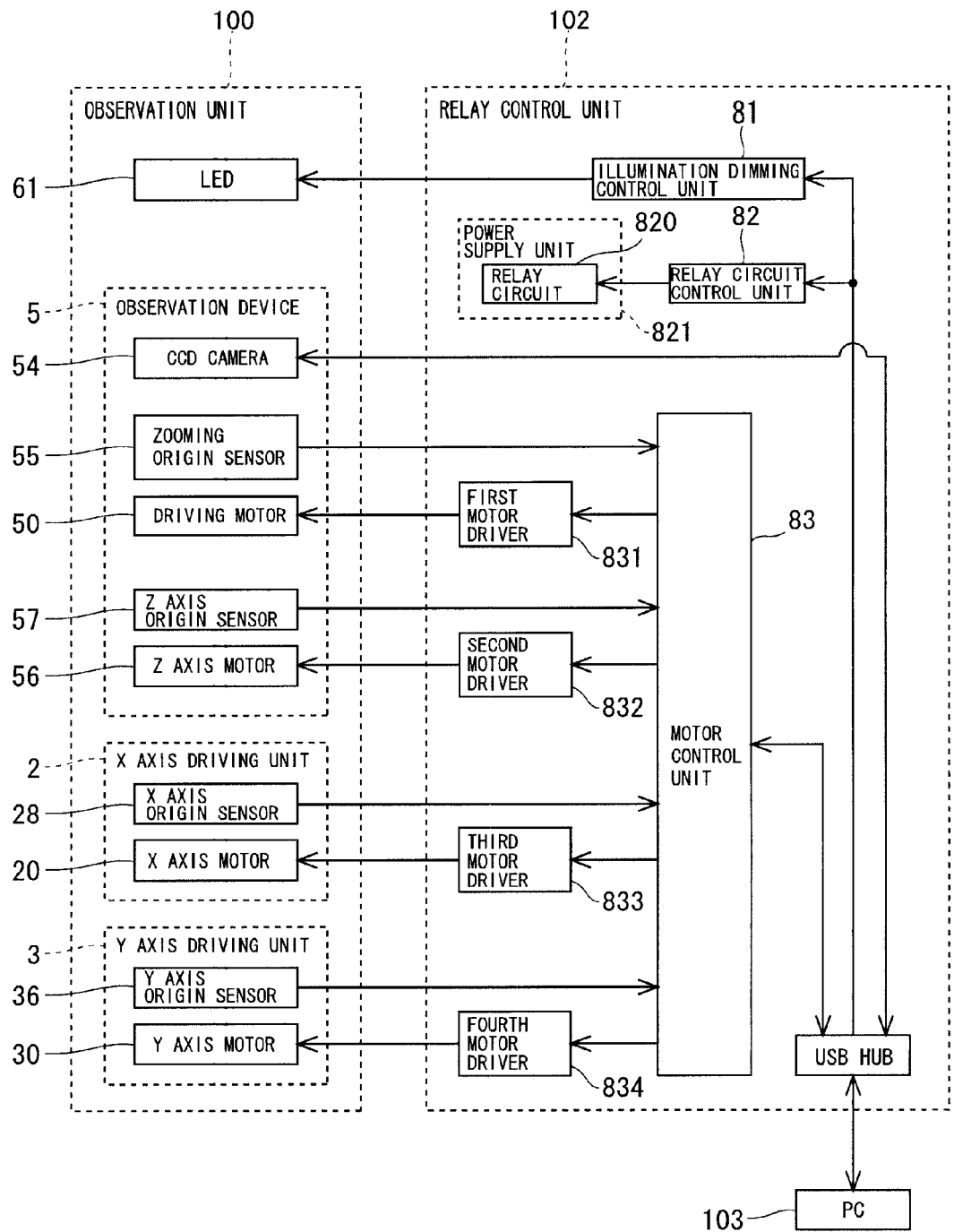
FIG. 8 is a block diagram illustrating the configuration of the observation unit and a relay control unit both included in the observation system.

FIG. 8 is a block diagram illustrating the configuration of the observation unit 100 and relay control unit 102 included in the observation system. As illustrated in FIG. 8, the relay control unit 102 includes an illumination dimming control unit 81, a power supply unit 821 with a relay circuit 820, a relay circuit control unit 82, four motor drivers 831 to 834, and a motor control unit 83.

The illumination dimming control unit 81 controls a light emission operation of the LED 61 provided in the observation unit 100 to adjust the LED duty of the LED 61.

The relay circuit 820 in the power supply unit 821 performs a relay operation of switching on and off a main power supply of the observation unit 100 and a relay operation of independently switching on and off the electric continuity of the CCD camera 54, LED 61, the motors, and the origin sensors provided in the observation unit 100. The relay circuit control unit 82 controls independently the relay operations of the relay circuit 820 to control the electric continuity of the CCD camera 54, LED 61, motors, and origin sensors provided in the observation unit 100 (to controllably turn on and off the electric continuity of these components).

The four motor drives 831 to 834 operate as follows. The first motor driver 831 drives the driving motor 50, and the second motor driver 832 drives the Z axis motor 56. The third motor driver 833 drives the X axis motor 20, and the fourth motor driver 834 drives the Y axis motor 30. The motor control unit 83 controls independently the four motor drivers 831 to 834 to control the rotation operation of each of the motors. Furthermore, based on a sense signal from each of the origin sensors, the motor control unit 83 can control the rotation operation of the motor paired with the origin sensor.

4. Personal Computer 4-1. General Configuration of the Personal Computer

FIG. 9 is a block diagram illustrating the configuration of the personal computer 103 included in the aforementioned observation system. As illustrated in FIG. 9, the personal computer 103 includes the observation unit control unit 7 configured to function as a control device that controls the observation unit 100, the memory 70 configured to record sample information and the like which is required to control the time lapse operation of the observation unit 100, a communication unit 701 configured to communicate with the relay control unit 102 through the cable 106, an output unit 702 connected to an output device 202 such as a display or a speaker, and a bus 703 configured to connect the components 7, 70, 701, and 702 together inside the personal computer 103. Here, an input device 201 such as a mouse or a keyboard is further connected to the bus 703 to input various instructions.

Observation images of samples acquired by the CCD camera 54 of the observation unit 100 may be recorded in the memory 70.

4-2. Configuration of the Observation Unit Control Unit

The observation unit control unit 7 transmits control instructions to the relay control unit 102 or to the observation unit 100 through the relay control unit 102, to control the operation of the observation unit 100.

Specifically, the observation unit control unit 7 transmits an LED control instruction to the relay control unit 102. Then, the illumination dimming control unit 81 receives the LED control instruction to control the light emission operation of the LED 61 in the observation unit 100. The observation unit control unit 7 transmits a relay control instruction to the relay control unit 102. Then, the relay circuit control unit 82 receives the relay control instruction to control the relay operation of the relay circuit 820 in the power supply unit 821. The observation unit control unit 7 transmits a motor control instruction to the relay control unit 102. Then, the motor control unit 83 receives the motor control instruction to control independently the four motor drivers 831 to 834, thus controlling the rotation operation of each of the motors for the observation unit 100.

Furthermore, the observation unit control unit 7 transmits a camera control instruction to the observation unit 100 through the relay control unit 102 to control an image pickup operation (the operation of acquiring observation images) of the CCD camera 54.

The configuration of the observation unit control unit 7 will be described in detail. As illustrated in FIG. 9, the observation unit control unit 7 includes the search operation control unit 71, the time lapse operation control unit 72, and a luminance control unit 74. The control (described below in detail) performed by the control units 71, 72, and 74 may be implemented by allowing the personal computer 103 to execute the control program.

<Search Operation Control Unit>

When a selection instruction to select the search mode as a mode to be set for the observation unit 100 is input to the search operation control unit 71 via the input device 201, the search operation control unit 71 is activated in response to the selection instruction. Then, the search operation control unit 71 shifts to a state in which the search operation of the observation unit 100 can be controlled. Thus, the observation unit 100 is set to the search mode.

With the search mode set for the observation unit 100, the search operation control unit 71 controls the search operation of the observation unit 100 based on an operation instruction input by the user via the input device 201.

Specifically, the search operation control unit 71 transmits the motor control instruction to the motor control unit 83 of the relay control unit 102 in accordance with a search operation performed by the user using the input device 201. Thus, the rotation operation of each of the motors provided in the observation unit 100 is controlled depending on the user's search operation. As a result, the coordinates of the sample placed at the observation point M, the zoom factor, and the focus position are changed.

Furthermore, when the user inputs a determination instruction via the input device 201 to determine the sample for which an observation image is to be acquired by the observation device 5, the search operation control unit 71 receives the determination instruction to record, in the memory 70, the sample information on the sample located at the observation point M at the time of the reception of the determination instruction.

<Time Lapse Operation Control Unit>

When a selection instruction to select the time lapse mode as a mode to be set for the observation unit 100 is input via the input device 201, the time lapse operation control unit 72 is activated in response to the selection instruction. Then, the time lapse operation control unit 72 shifts to a state in which the time lapse operation of the observation unit 100 can be controlled. Thus, the observation unit 100 is set to the time lapse mode.

With the time lapse mode set for the observation unit 100, the time lapse operation control unit 72 reads in the sample information and set information recorded in the memory 70. The time lapse operation control unit 72 then controls the time lapse operation of the observation unit 100 based on the sample information and set information.

Specifically, the time lapse operation control unit 72 transmits the motor control instruction to the motor control unit 83 of the relay control unit 102 based on the sample information and set information recorded in the memory 70. Thus, the rotation operation of each of the motors provided in the observation unit 100 is controlled in accordance with the sample information and set information.

Furthermore, the time lapse operation control unit 72 controls the rotation operation of each of the motors for each sample with sample information based on the sample information and set information. Thereafter, the time lapse operation control unit 72 transmits the camera control instruction to the CCD camera 54 in the observation unit 100. Thus, the CCD camera 54 acquires observation images of all the samples with sample information.

<Luminance Control Unit>

The luminance control unit 74 adjusts the luminance of observation images acquired by the CCD camera 54. The luminance control unit 74 includes an illuminance control unit 741 and a shutter speed control unit 742. Here, to adjust the luminance of observation images, the LED duty of the LED 61, the shutter speed of the CCD camera 54, and the camera gain of the CCD camera 54 can be used as parameters. However, if the camera gain is used as a parameter to adjust the luminance of observation images, the observation images acquired by the CCD camera 54 are of low image quality because of noise contained therein. Hence, the present embodiment uses the LED duty of the LED 61 and the shutter speed of the CCD camera 54 as parameters to adjust the luminance of observation images.

Furthermore, a luminance control operation of the luminance control unit 74 is performed based on a luminance control instruction transmitted to the luminance control unit 74 by the search operation control unit 71 or the time lapse operation control unit 72. Here, the transmission of the luminance control instruction from the search operation control unit 71 can be carried out only when the search operation control unit 71 is active, that is, only when the observation unit 100 is set to the search mode. The transmission of the luminance control instruction from the time lapse operation control unit 72 can be carried out only when the time lapse operation control unit 72 is active, that is, only when the observation unit 100 is set to the time lapse mode.

The illuminance control unit 741 generates an LED duty instruction value varying depending on the LED duty to be set for the LED 61. The illuminance control unit 741 then transmits an LED control instruction from the observation unit control unit 7 to the relay control unit 102. At this time, the transmitted LED control instruction contains the LED duty instruction value generated by the illuminance control unit 741, as instruction information. The illuminance dimming control unit 81 receives the LED control instruction to adjust the LED duty of the LED 61 based on the LED duty instruction contained in the LED control instruction. Thus, the LED duty of the LED 61 is set to a value corresponding to the LED duty instruction value.

In the present embodiment, a predetermined LED duty (in the present embodiment, the upper limit value of a range that can be set for the LED 61) to be set for the LED 61 when the time lapse mode is set for the observation unit 100 is recorded in the memory 70. When the illuminance control unit 741 receives the luminance control instruction from the time lapse operation control unit 72, that is, when the time lapse mode is set for the observation unit 100, the illuminance control unit 741 reads out the predetermined LED duty recorded in the memory 70. The luminance control unit 741 then generates an LED duty instruction value corresponding to the predetermined LED duty. Thereafter, the illuminance control unit 741 allows the observation unit control unit 7 to transmit the LED control instruction to the relay control unit 102. Thus, the LED duty of the LED 61 is set to the predetermined value recorded in the memory 70.

Furthermore, upon receiving the luminance control instruction from the search operation control unit 71, the illuminance control unit 741 generates an LED duty instruction value smaller than that generated upon reception of the luminance control instruction from the time lapse operation control unit 72. Thus, the LED duty set for the LED 61 when the search mode is set for the observation unit 100 is lower than that set for the LED 61 when the time lapse mode is set for the observation unit 100.

The shutter speed control unit 742 generates a shutter speed instruction value that varies depending on the shutter speed to be set for the CCD camera 54. The shutter speed control unit 742 then allows the observation unit control unit 7 to transmit the camera control instruction to the observation unit 100. At this time, the transmitted camera control instruction contains the shutter speed instruction value generated by the shutter speed instruction unit 742, as instruction information. The CCD camera 54 receives the camera control instruction to adjust the shutter speed of the CCD camera 54 based on the shutter speed instruction value contained in the camera control instruction. Thus, the shutter speed of the CCD camera 54 is set to a value corresponding to the shutter speed instruction value.

In the present embodiment, a predetermined shutter speed (in the present embodiment, the lower limit value of a range that can be set for the CCD camera 54) to be set for the CCD camera 54 when the search mode is set for the observation unit 100 is recorded in the memory 70. When the shutter speed control unit 742 receives the luminance control instruction from the search operation control unit 71, that is, when the search mode is set for the observation unit 100, the shutter speed control unit 742 reads out the predetermined shutter speed recorded in the memory 70. The shutter speed control unit 742 then generates a shutter speed instruction value corresponding to the predetermined shutter speed. Thereafter, the shutter speed control unit 742 allows the observation unit control unit 7 to transmit the camera control instruction to the observation unit 100. Thus, the shutter speed of the CCD camera 54 is set to the predetermined value recorded in the memory 70.

Here, the illuminance control unit 741 and shutter speed control unit 742 of the luminance control unit 74 adjust the LED duty of the LED 61 and/or the shutter speed of the CCD camera 54 so that the average luminance of observation images acquired by the CCD camera 54 falls within a predetermined range of values. The predetermined luminance range is, for example, previously set and recorded in the memory 70 by the user.

Specifically, when the illuminance control unit 741 of the luminance control unit 74 adjusts the LED duty of the LED 61, the illuminance control unit 741 performs feedback control to repeatedly adjust the LED duty of the LED 61 until the average luminance of observation images acquired by the CCD camera 54 falls within the predetermined range of values. A time required for this repetition is hereinafter referred to as a "time required to adjust the LED duty".

Furthermore, when the shutter speed control unit 742 of the luminance control unit 74 adjusts the shutter speed of the CCD camera 54, the shutter speed control unit 742 performs feedback control to repeatedly adjust the shutter speed of the CCD camera 54 until the average luminance of observation images acquired by the CCD camera 54 falls within the predetermined range of values. A time required for this repetition is hereinafter referred to as a "time required to adjust the shutter speed".

In the present embodiment, the time required to adjust the shutter speed of the CCD camera 54 is shorter than that required to adjust the LED duty of the LED 61.

In the observation unit control unit 7 configured as described above, the search operation control unit 71 provides a control function to control the LED 61 using the illuminance control unit 741 so as to adjust the LED duty of the LED 61 when the search mode is set for the observation unit 100, and a control function to control the CCD camera 54 using the shutter speed control unit 742 so as to adjust the shutter speed of the CCD camera 54 when the search mode is set for the observation unit 100.

Furthermore, the time lapse operation control unit 72 provides a control function to control the LED 61 using the illuminance control unit 741 so as to adjust the LED duty of the LED 61 when the time lapse mode is set for the observation unit 100, and a control function to control the CCD camera 54 using the shutter speed control unit 742 so as to adjust the shutter speed of the CCD camera 54 when the time lapse mode is set for the observation unit 100.

Figure 10:
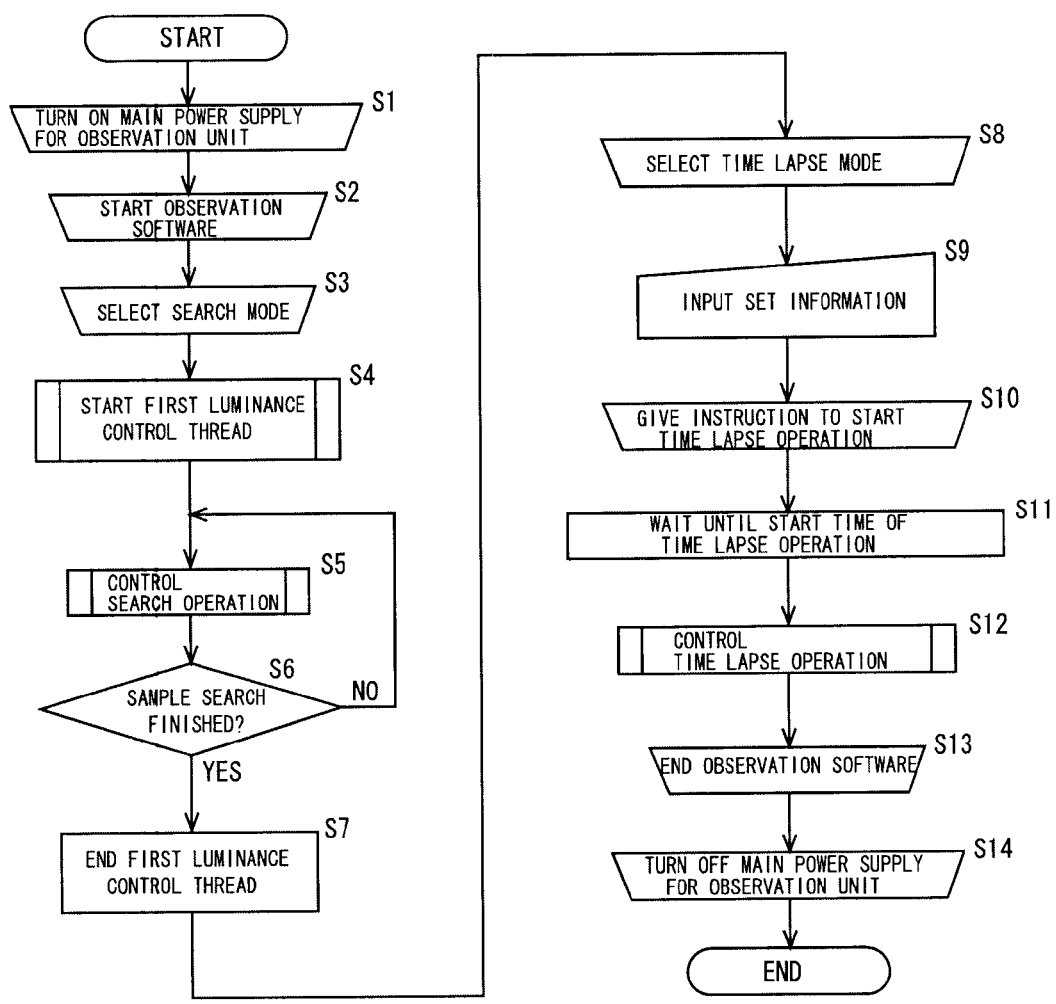
FIG. 10 is a flowchart illustrating an observation operation procedure carried out in the observation system.

5. Observation Operation Procedure Carried Out in the Observation System 5-1. General Flow of the Observation Operation Procedure FIG. 10 is a flowchart illustrating an observation operation procedure carried out in the observation system. When the observation operation procedure is started in the observation system, first, in step S1, the user operates a power supply switch (not illustrated in the drawings) provided in the relay control unit 102 to input, to the relay circuit control unit 82, a power-on instruction to set the main power supply for the observation unit 100 so that the main power supply is turned on. The relay circuit control unit 82 receives the power-on instruction to control the relay operation of the relay circuit 820. As a result, the main power supply for the observation unit 100 is turned from off to on.

The main power supply for the observation unit 100 may be mechanically turned from off to on using only the power supply switch without using the relay circuit control unit 82.

Then, in step S2, the user operates the input device 201 to start observation software in the personal computer 103. Thereafter, in step S3, the user operates the input device 201 to input a selection instruction to select the search mode, to the search operation control unit 71 of the observation unit control unit 7. Thus, the search operation control unit 71 shifts to a state in which the search operation of the observation unit 100 can be controlled. The observation unit 100 is set to the search mode.

Then, in step S4, the luminance control unit 74 receives a thread start instruction from the search operation control unit 71 to start carrying out a first luminance control thread configured to adjust the luminance of observation images acquired by the CCD camera 54 with the search mode set for the observation unit.

5-2. First Luminance Control Thread

Figure 11:
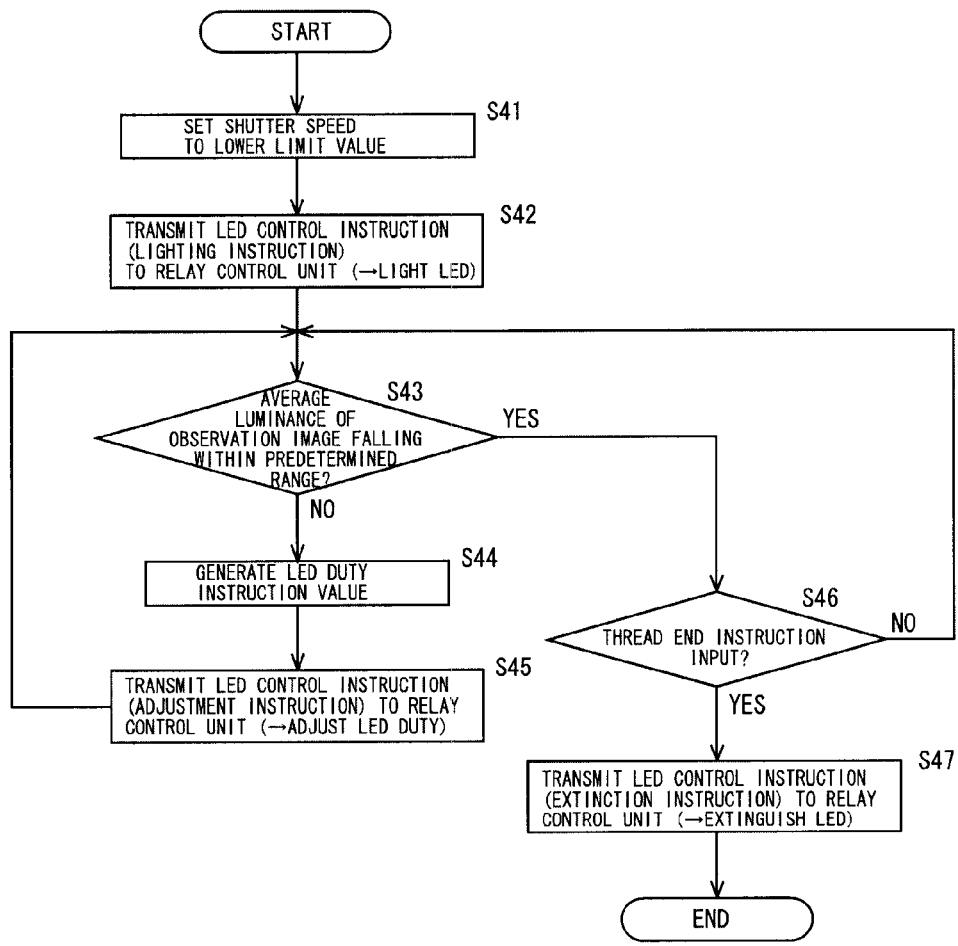
FIG. 11 is a flowchart illustrating a first luminance control thread included in the observation operation procedure.

FIG. 11 is a flowchart illustrating the first luminance control thread. When the luminance control unit 74 starts the first luminance control thread, first, in step S41, the shutter speed control unit 742 reads out the predetermined shutter speed (in the present embodiment, the lower limit value of the range that can be set for the CCD camera 54) recorded in the memory 70 to generate a shutter speed instruction value corresponding to the predetermined shutter speed. Thereafter, the observation unit control unit 7 transmits the camera control instruction to the observation unit 100. Thus, the shutter speed of the CCD camera 54 is set to the lower limit value.

If an observation image acquired by the CCD camera 54 is blurred or a real time property is degraded as a result of the setting of the shutter speed of the CCD camera 54 to the lower limit value, the shutter speed of the CCD camera 54 may be set to a value that is larger than the lower limit value and at which the blurring of the observation image or the degradation of the real time property is unlikely to occur.

Then, in step S42, the observation unit control unit 7 transmits the LED control instruction (lighting instruction) to the relay control unit 102. Thus, the illumination dimming control unit 81 receives the LED control instruction to control the LED 61. As a result, the LED 61 is lighted.

The electric continuity of the LED 61 may be controllably turned on to light the LED 61 by controlling the relay operation of the relay circuit 820 using the relay circuit control unit 82 without using the illumination dimming control unit 81. This also applies to the description below.

Thereafter, in step S43, the luminance control unit 74 determines whether or not the average luminance of observation images acquired by the CCD camera 54 falls within a predetermined range of values. If in step S43, the average luminance of observation images acquired by the CCD camera 54 is determined not to fall within the predetermined range of values (No), then in step S44, the illuminance control unit 741 generates an LED duty instruction value to be transmitted to the illumination dimming control unit 81 to allow the illumination dimming control unit 81 to adjust the LED duty of the LED 61 so that the average luminance of observation images acquired by the CCD camera 54 falls within the predetermined range of values.

After step S44 is executed, the flow shifts to step S45. In step S45, the observation unit control unit 7 transmits the LED control instruction (adjustment instruction) containing, as instruction information, the LED duty instruction value generated in step S44, to the relay control unit 102. Thus, the illumination dimming control unit 81 receives the LED control instruction to control the LED 61. As a result, the LED duty of the LED 61 is set to a value corresponding to the LED duty instruction value. Thereafter, the flow returns to step S43, where step S43 is executed again. Then, steps S43 to S45 are repeatedly executed until the determination in step S43 changes to Yes (feedback control).

On the other hand, if in step S43 the average luminance of observation images is determined to fall within the predetermined range of values (Yes), then in step S46 the process determines whether or not a thread end instruction has been input to the luminance control unit 74. If in step S46 the process determines that the thread end instruction has been input (Yes), then in step S47, the observation unit control unit 7 transmits the LED control instruction (extinction instruction) to the relay control unit 102. Thus, the illumination dimming control unit 81 receives the LED control instruction to control the LED 61. As a result, the LED 61 is extinguished.

The electric continuity of the LED 61 may be controllably turned off to extinguish the LED 61 by controlling the relay operation of the relay circuit 820 using the relay circuit control unit 82 without using the illumination dimming control unit 81. This also applies to the description below.

After step S47 is executed, the first luminance control thread carried out by the luminance control unit 74 ends.

In contrast, if in step S46, the process determines that the thread end instruction has not been input (No), the flow shifts to step S43, where steps S43 to S46 are executed. Steps S43 to S46 are repeatedly executed until the determination in step S46 changes to Yes.

5-3. Search Operation Control Procedure

As illustrated in FIG. 10, after step S4 is executed, the search operation control unit 71 controls the search operation of the observation unit 100 in step S5.

Figure 12:
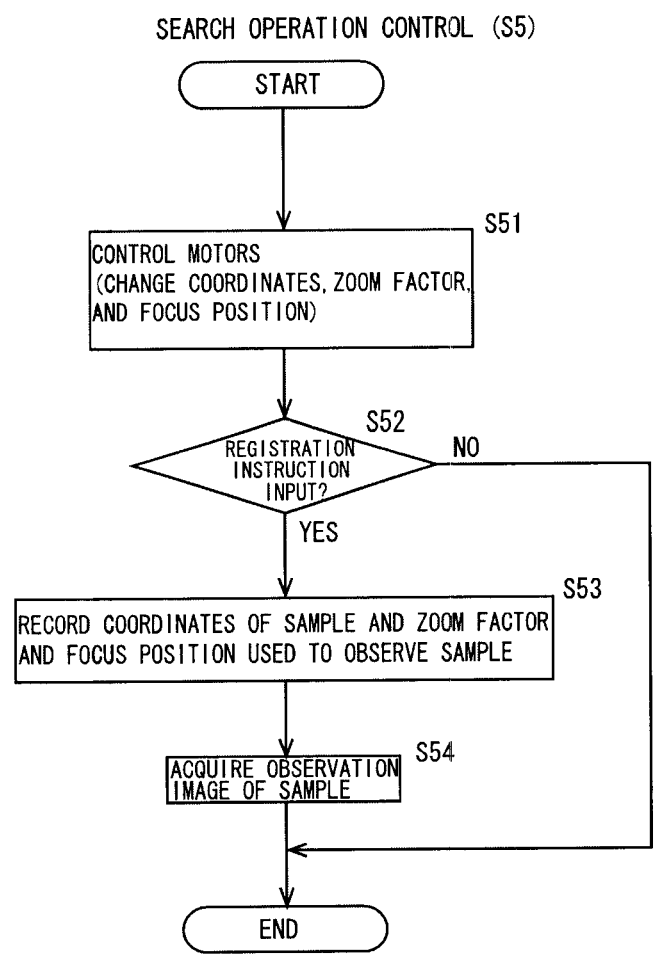
FIG. 12 is a flowchart illustrating a search operation control procedure included in the observation operation procedure.

FIG. 12 is a flowchart illustrating a search operation control procedure carried out by the search operation control unit 71. When the search operation control procedure is started by the search operation control unit 71, first, in step S51, the search operation control unit 71 transmits the motor control instruction to the motor control unit 83 of the relay control unit 102 in accordance with a search operation performed by the user using the input device 201. Thus, the rotation operation of each of the motors provided in the observation unit 100 is controlled in accordance with the user's search operation. As a result, the coordinates of the sample placed at the observation point M, the zoom factor, and the focus position are changed.

The user performs the operation of searching for the sample while viewing a video of the sample shown on the display connected to the personal computer 103.

Then, in step S52, the search operation control unit 71 determines whether or not the user has operated the input device 201 to input a registration instruction to register the sample located at the observation point M as one or more samples for which observation images are to be acquired by the observation device 5. Upon determining in step S52 that the registration instruction has been input (Yes), the search operation control unit 71 records, in step S53, the coordinates of the sample located at the observation point M and the zoom factor and focus position used to observe the sample, in the memory 70.

Thereafter, in step S54, the search operation control unit 71 transmits the camera control instruction to the CCD camera 54 to allow the CCD camera 54 to perform an image pickup operation. Thus, an observation image of the registered sample is acquired by the CCD camera 54. The acquired observation image is recorded in the memory 70. After step S54 is executed, the search operation control procedure carried out by the search operation control unit 71 ends.

On the other hand, if in step S52, the process determines that the registration instruction has not been input (No), the search operation control procedure carried out by the search operation control unit 71 ends.

5-4. General Flow of the Observation Operation Procedure (Continued from the Above Description)

As illustrated in FIG. 10, after step S5 is executed, the observation unit control unit 7 determines, in step S6, whether or not the user has operated the input device 201 to input a search end instruction to end the sample search. If the user has input the search end instruction and the observation unit control unit 7 determines, in step 6, that the search end instruction has been input (Yes), then in step S7, the search operation control unit 71 transmits the thread end instruction to the luminance control unit 74. The luminance control unit 74 receives the thread end instruction to end the first luminance control thread (step S46 in FIG. 11).

On the other hand, if the user continues the sample search and the observation unit control unit 7 determines, in step 6, that the search end instruction has not been input (No), the flow returns to step S5, where the search operation control procedure is carried out again. Then, step S5 is repeatedly executed until the determination in step S6 changes to Yes. The sample information on the plurality of samples to be observed is recorded in the memory 70.

After step S7 is executed, the user operates, in step S8, the input device 201 to input a selection instruction to select the time lapse mode, to the time lapse operation control unit 72 of the observation unit control unit 7. Thus, the time lapse operation control unit 72 shifts to a state in which the time lapse operation of the observation unit 100 can be controlled. The observation unit 100 is set to the time lapse mode.

Then, in step S9, the user operates the input device 201 to input the set information (the list of observation points, the start time, the end time, the time lapse period, the location where each observation image is stored, and the like) required to allow the observation unit 100 to perform the time lapse operation. Thereafter, in step S10, when the user operates the input device 201 to input a start instruction to start performing the time lapse operation, the time lapse operation control unit 72, in step S11, reads in a piece of the set information recorded in the memory 70 which relates to the time to start the time lapse operation. The time lapse operation control unit 72 thereafter waits until the start time.

After the wait in step S11, the observation unit control unit 7 controls the time lapse operation of the observation unit 100 in step S12.

5-5. Time Lapse Operation Control Procedure

<General Flow of the Time Lapse Operation Control Procedure>

Figure 13:
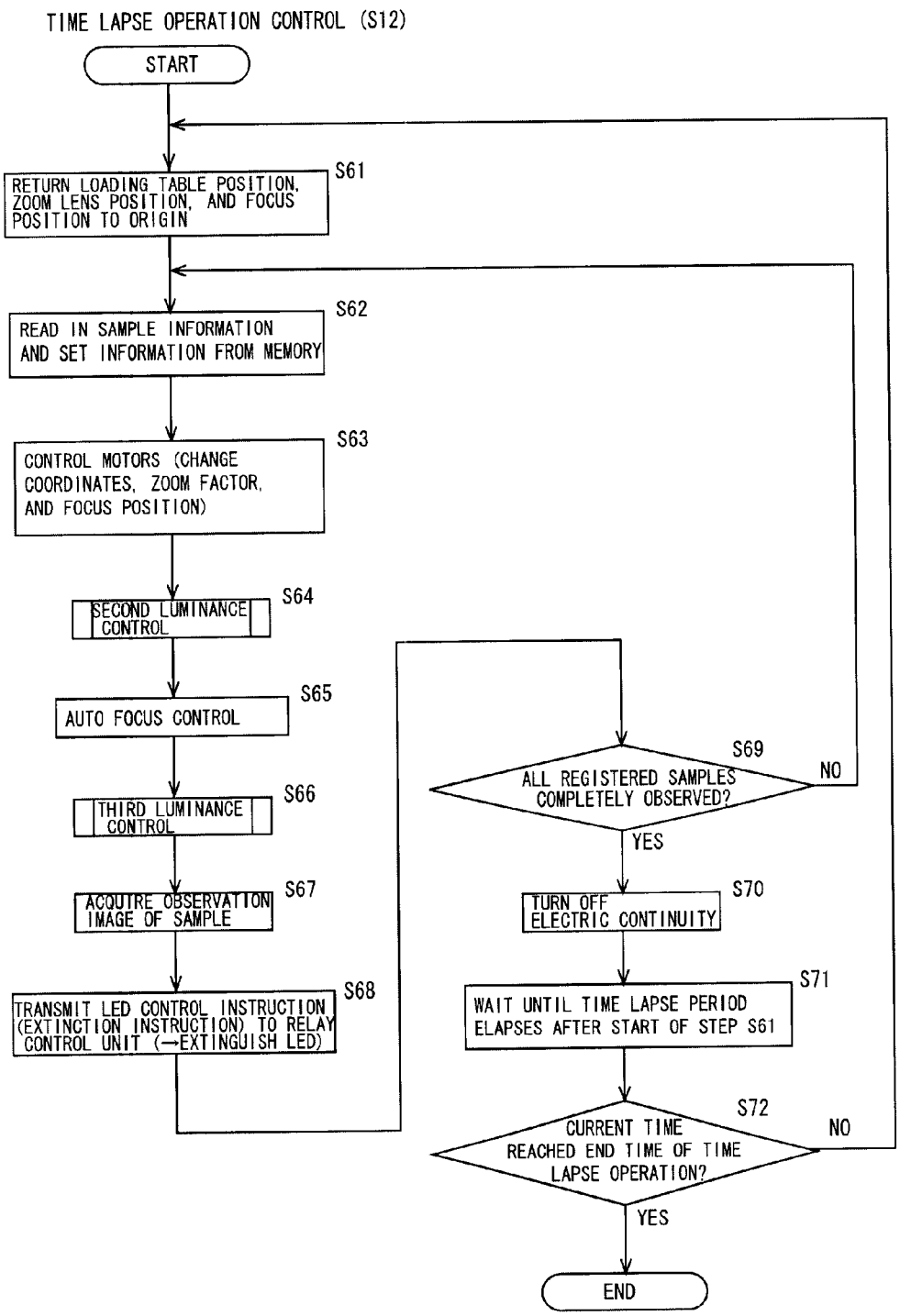
FIG. 13 is a flowchart illustrating a time lapse operation control procedure included in the observation operation procedure.

FIG. 13 is a flowchart illustrating the time lapse operation control procedure carried out by the time lapse operation control unit 72. Upon starting the time lapse operation control procedure, the time lapse operation control unit 72 first transmits, in step S61, the motor control instruction (origin return instruction) to the motor control unit 83 of the relay control unit 102. Thus, based on a sense signal from each of the origin sensors, the motor control unit 83 controls the rotation operation of the motor paired with the origin sensor. As a result, the loading table 4 returns to the origin of an XY coordinate system. The zoom lens 53 returns to a predetermined position. The observation device 5 returns to the origin in the Z axis direction.

Then, in step S62, the time lapse operation control unit 72 reads in the sample information and set information recorded in the memory 70.

Thereafter, in step S63, the time lapse operation control unit 72 transmits the motor control instruction to the motor control unit 83 of the relay control unit 102 based on the sample information and set information read from the memory 70. Thus, the rotation operation of each of the motors provided in the observation unit 100 is controlled in accordance with the sample information and the set information. As a result, the coordinates of the sample located at the observation point M, the zoom factor, and the focus position are changed to those contained in the sample information in accordance with the list of observation points contained in the set information.

Then, in step S64, the time lapse operation control unit 72 transmits the luminance control instruction to the luminance control unit 74. The luminance control unit 74 receives the luminance control instruction from the time lapse operation control unit 72 to carry out a second luminance control procedure for adjusting the luminance of observation images acquired by the CCD camera 54 with the time lapse mode set for the observation unit.

<Second Luminance Control Procedure>

Figure 14:
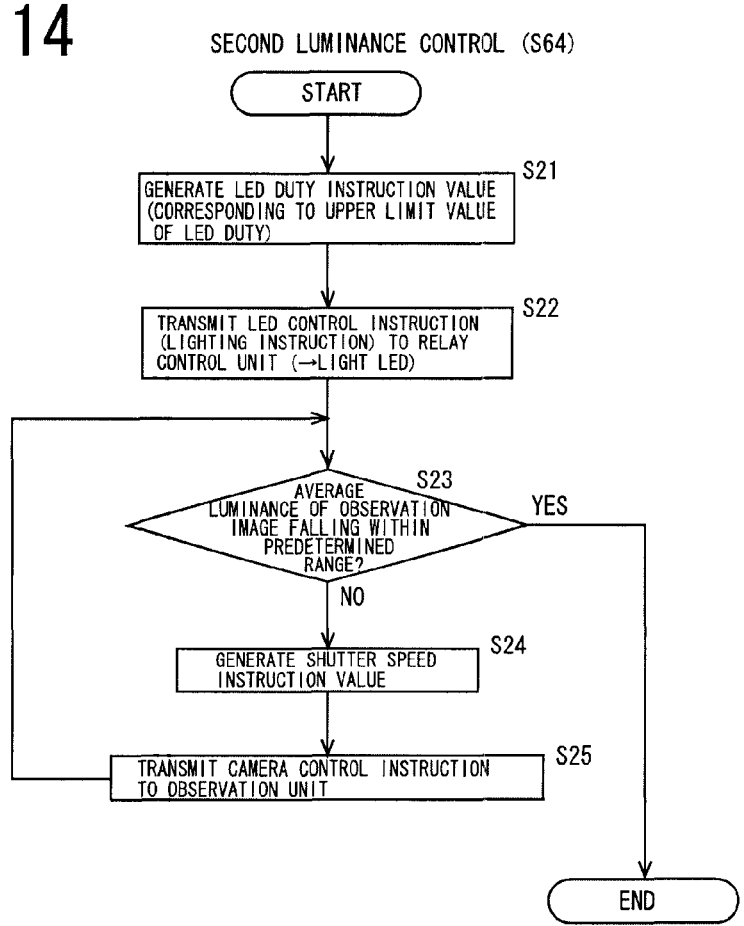
FIG. 14 is a flowchart illustrating a second luminance control procedure included in the time lapse operation control procedure.

FIG. 14 is a flowchart illustrating the second luminance control procedure. When the luminance control unit 74 starts the second luminance control procedure, first, in step S21, the illuminance control unit 741 reads out the predetermined LED duty (in the present embodiment, the upper limit value of the range that can be set for the LED 61) recorded in the memory 70. The illuminance control unit 741 generates an LED duty instruction value corresponding to the predetermined LED duty.

Then, in step S22, the observation unit control unit 7 transmits the LED control instruction (lighting instruction) containing, as instruction information, the LED duty instruction value generated in step S21, to the relay control unit 102. Thus, the illumination dimming control unit 81 receives the LED control instruction to control the LED 61. As a result, the LED 61 is lighted with the LED duty set to the upper limit value.

Then, in step S23, the luminance control unit 74 determines whether or not the average luminance of observation images acquired by the CCD camera 54 falls within a predetermined range of values. If in step S23 the luminance control unit 74 determines that the average luminance of observation images falls within the predetermined range of values (Yes), the shutter speed of the CCD camera 54 fails to be adjusted. The second luminance control procedure carried out by the luminance control unit 74 then ends.

On the other hand, if in step S23, the luminance control unit 74 determines that the average luminance of observation images fails to fall within the predetermined range of values (No), then in step S24, the shutter speed control unit 742 generates a shutter speed instruction value to be transmitted to the CCD camera 54 to adjust the shutter speed of the CCD camera 54 so that the average luminance of observation images acquired by the CCD camera 54 falls within the predetermined range of values.

After step S24 is executed, the observation unit control unit 7 transmits, in step S25, the camera control instruction containing, as instruction information the shutter speed instruction value generated in step S24, to the observation unit 100. Thus, the shutter speed of the CCD camera 54 is set to a value corresponding to the shutter speed instruction value. Thereafter, the flow returns to step S23, which is then executed again. Then, steps S23 to S25 are repeatedly executed until the determination in step S23 changes to Yes (feedback control).

<General Flow of the Time Lapse Operation Control Procedure (Continued from the Above Description)>

As illustrated in FIG. 13, after the second luminance control procedure in step S64 ends, the time lapse operation control unit 72 performs auto focus control in step S65. Thus, the focus position is automatically adjusted.

Then, in step S66, the time lapse operation control unit 72 transmits the luminance control instruction to the luminance control unit 74 again. The luminance control unit 74 again receives the luminance control instruction from the time lapse operation control unit 72 to carry out a third luminance control procedure for adjusting the luminance of observation images acquired by the CCD camera 54 with the time lapse mode set for the observation unit.

<Third Luminance Control Procedure>

Figure 15:
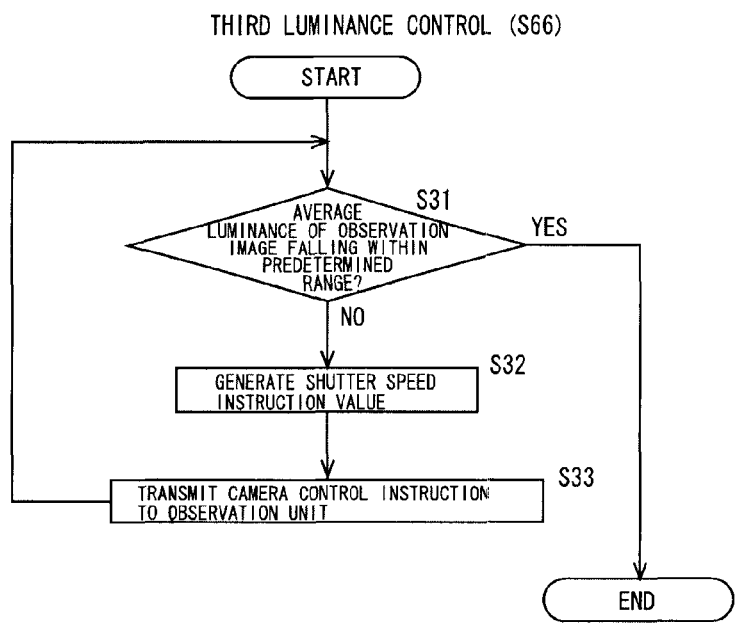
FIG. 15 is a flowchart illustrating a third luminance control procedure included in the time lapse operation control procedure.

FIG. 15 is a flowchart illustrating the third luminance control procedure. When the luminance control unit 74 starts the third luminance control procedure, first, in step S31, the luminance control unit 74 determines whether or not the average luminance of observation images acquired by the CCD camera 54 falls within the predetermined range of values. If in step S31, the luminance control unit 74 determines that the average luminance of observation images falls within the predetermined range of values (Yes), the shutter speed of the CCD camera 54 is not adjusted. The third luminance control procedure carried out by the luminance control unit 74 then ends.

On the other hand, if in step S31 the luminance control unit 74 determines that the average luminance of observation images fails to fall within the predetermined range of values (No), then in step S32, the shutter speed control unit 742 generates a shutter sped instruction value to be transmitted to the CCD camera 54 to adjust the shutter speed of the CCD camera 54 so that the average luminance of observation images acquired by the CCD camera 54 falls within the predetermined range of values.

After step S32 is executed, the observation unit control unit 7 transmits, in step S33, the camera control instruction containing, as instruction information the shutter speed instruction value generated in step S32, to the observation unit 100. Thus, the shutter speed of the CCD camera 54 is set to a value corresponding to the shutter speed instruction value. Thereafter, the flow returns to step S31, which is then executed again. Then, steps S31 to S33 are repeatedly executed until the determination in step S31 changes to Yes (feedback control).

According to the third luminance control procedure in step S66 described above, even if the auto focus control in step S65 is performed to cause the average luminance of observation images to deviate from the predetermined range, the average luminance of observation images is re-set to within the predetermined range.

<General Flow of the Time Lapse Operation Control Procedure (Continued from the Above Description)>

After the third luminance control procedure in step S66 ends, the time lapse operation control unit 72 transmits, in step S67, the camera control instruction to the CCD camera 54 to allow the CCD camera 54 to perform an image pickup operation. Thus, an observation image of the sample located at the observation point M in step S63 is acquired by the CCD camera 54. The acquired observation image is recorded in the memory 70.

Then, in step S68, the observation unit control unit 7 transmits the LED control instruction (extinction instruction) to the relay control unit 102. Thus, the illumination dimming control unit 81 receives the LED control instruction to control the LED 61. As a result, the LED 61 is extinguished.

Thereafter, in step S69, the time lapse operation control unit 72 determines whether or not all the samples registered in the observation point list have been completely observed. If in step S69, the time lapse operation control unit 72 determines that not all the samples have been completely observed (No), the flow returns to step S62, where steps S62 to S69 are executed again. Then, steps S62 to S69 are repeatedly executed until the determination in step S69 changes to Yes.

If in step S69 the time lapse operation control unit 72 determines that all the samples have been completely observed (Yes), then in step S70, the time lapse operation control unit 72 transmits the relay control instruction to the relay circuit control unit 82 to allow the relay circuit control unit 82 to controllably turn off the electric continuity of the CCD camera 54, X axis motor 20, and Y axis motor 30 provided in the observation unit 100.

The electric continuity of the LED 61 is controllably turned on in step S22 (FIG. 14) of the second luminance control procedure (step S64) and turned off in step S68 of the second luminance control procedure. The electric continuity of the Z axis motor 56 is controllably turned on when the focus position is changed in step S63 and when the auto focus control is performed in step S65. The electric continuity of the Z axis motor 56 is controllably turned off immediately after step S63 is executed and immediately after step S65 is executed. The driving motor 50 is controllably turned on when the zoom factor is changed in step S63 and is controllably turned off immediately after step S63 is executed. The electric continuity of each of the origin sensors is controllably turned on when the origin return is carried out in step S61 and is controllably turned off immediately after step S61 is executed.

Then, in step S71, the time lapse operation control unit 72 waits after the execution of step S61 is started (if step S61 is executed a plurality of times, after the execution of the last step S61 is started) and before the time lapse period contained in the set information elapses.

After step S71 is executed, the process determines, in step S72, whether or not the current time has reached the end time of the time lapse information contained in the set information. If in step S72, the process determines that the current time has reached the end time (Yes), the time lapse operation control procedure carried out by the time lapse operation control unit 72 ends. On the other hand, if in step S72, the process determines that the current time has not reached the end time (No), the flow returns to step S61, where steps S61 to S72 are executed again. Steps S61 to S72 are repeatedly executed until the determination in step S72 changes to Yes.

5-6. General Flow of the Observation Operation Procedure (Continued from the Above Description)

As illustrated in FIG. 10, after the time lapse operation control procedure ends in step S12, the user operates, in step S13, the input device 201 to terminate the observation software in the personal computer 103. Thereafter, in step S14, the user operates the power supply switch (not illustrated in the drawings) provided in the relay control unit 102 to input, to the relay circuit control unit 82, a power-off instruction to set the main power supply for the observation unit 100 so that the main power supply is turned off. The relay circuit control unit 82 receives the power-off instruction to control the relay operation of the relay circuit 820. As a result, the main power supply for the observation unit 100 is turned off.

The main power supply for the observation unit 100 may be mechanically turned off using only the power supply switch without using the relay circuit control unit 82.

The execution of step S14 ends the observation operation procedure in the observation system.

Among the aforementioned observation operation procedures, the following can be implemented by allowing the personal computer 103 to execute the control program: the first luminance control thread illustrated in FIG. 11, the search operation control procedure illustrated in FIG. 12, step S11 illustrated in FIG. 10, the time lapse operation control procedure, second luminance control procedure, and third luminance control procedure illustrated in FIG. 13 to FIG. 15, respectively.

5-7. Advantages and Effects

According to the observation operation procedure carried out in the aforementioned observation system, an observation image of the sample registered by the user is periodically acquired between the start time and end time of the time lapse operation. Thus, the culture condition of the sample can be observed and analyzed by utilizing acquired observation images of the sample.

Furthermore, in the first luminance control thread (step S4. See FIG. 10 and FIG. 11) of the observation operation procedure carried out in the observation system, the shutter speed of the CCD camera 54 is set to the lower limit value of the range that can be set for the CCD camera 54. The LED duty of the LED 61 is adjusted such that the average luminance of observation images acquired by the CCD camera 54 falls within the predetermined range. Hence, the LED duty of the LED 61 is set to a small value.

On the other hand, in the second luminance control thread (step S64. See FIG. 13 and FIG. 14) of the time lapse operation control procedure (step S12) of the observation operation procedure, the LED duty of the LED 61 is set to the upper limit value of the range that can be set for the LED 61.

Thus, the LED duty set for the LED 61 when the search mode is set for the observation unit 100 is lower than that set for the LED 61 when the time lapse mode is set for the observation unit 100.

Hence, with the search mode set for the observation unit, the sample search is carried out with an LED duty lower than that set for the LED 61 with the time lapse mode set for the observation unit. Thus, the amount of radiation and heat conduction from the illumination device 6 resulting from the light emission operation of the LED 61 decreases during the sample search. Thus, during the sample search, the amount of heat transmitted from the illumination device 6 to the sample decreases to suppress an increase in the temperature of the sample. As a result, the adverse effect of heat on the sample is reduced.

When a culture solution is used to culture the sample (cells), an increase in the temperature not only of the sample but also of the culture solution is suppressed. Consequently, the adverse effect of heat on the sample is reduced.

During the sample search, the electric continuity of the CCD camera 54 and the motors needs to be kept on. The reason is as follows. If the electric continuity of the X axis motor 20 and the Y axis motor 30 is controllably kept on during the sample search, only while the motors 20 and 30 are being driven, an external force such as vibration may be applied to the loading table 4, which is thus displaced to misalign the coordinates of the sample to be observed with the observation point M while the motors 20 and 30 are controllably turned off. Furthermore, if the electric continuity of the CCD camera 54, the Z axis motor 56, and the driving motor 50 is controllably kept on only while the motors 20 and 30 are being driven, time delay may occur after the user operates the input device 201 to input an operation instruction and before driving of the CCD camera 54 and the motors 56 and 50 is started. As a result, operability may be degraded.

In the aforementioned observation system, even in the situation where suppressing generation of heat by the CCD camera 54 and the motors as described above is difficult, the adverse effect of heat on the sample can be suppressed by setting the LED duty of the LED 61 to a small value as described above.

In the time lapse operation control procedure carried out in the observation system, the electric continuity of the CCD camera 54, the X axis motor 20, and the Y axis motor 30 is kept on during a period from transmission of the motor control instruction (origin return instruction) from the time lapse operation control unit 72 to the relay control unit 102 in step S61 until turning-off of the electric continuity in step S70. Thus, the amount of heat from the CCD camera 54, the X axis motor 20, and the Y axis motor 30 decreases consistently with this period.

In the second luminance control thread (step S64. See FIG. 13 and FIG. 14) of the time lapse operation control procedure (step S12) of the observation operation procedure carried out in the observation system, the LED duty of the LED 61 is set to the upper limit value of the range that can be set for the LED 61. Only one of the LED duty of the LED 61 and the shutter speed of the CCD camera 54, that is, the shutter speed of the CCD camera 54, is adjusted so that the average luminance of observation images acquired by the CCD camera 54 falls within the predetermined range of values.

Here, in the present embodiment, as described above, the time required to adjust the shutter speed of the CCD camera 54 is shorter than that required to adjust the LED duty of the LED 61. This serves to reduce the time required to adjust the luminance of observation images of the sample acquired by the CCD camera 54. This in turn results in a reduction in the time for which the LED 61 illuminates the sample and in the period for which the CCD camera 54, the X axis motor 20, and the Y axis motor 30 are electrically continuous, when the sample is observed with the observation mode set for the observation unit. Therefore, the amount of heat transmitted from the illumination device 6, the CCD camera 54, the X axis motor 20, and the Y axis motor 30 to the sample decreases, allowing an increase in sample temperature to be suppressed. As a result, the adverse effect of heat on the sample is reduced.

Furthermore, the reduction in the time required to adjust the luminance of observation images of the sample acquired by the CCD camera 54 leads to a shortening of cycles required to observe all the samples registered in the observation point list. This enables the time lapse period, as set information, recorded in the memory 70 to be set to a reduced value. This in turn enables an increase in the number of cycles that can be carried out during a given period from the start time till end time of the time lapse operation.

As described above, the second luminance control procedure reduces the period during which the CCD camera 54, the X axis motor 20, and the Y axis motor 30 are electronically continuous. Thus, in particular, if the amount of heat transmitted from the CCD camera 54, the X axis motor 20, and the Y axis motor 30 to the sample is larger than that of heat transmitted from illumination device 6 to the sample as a result of radiation and heat conduction, carrying out the second luminance control procedure significantly effectively suppresses an increase in sample temperature.

6. Modifications 6-1. Modification 1

In the aforementioned embodiment, with the search mode set for the observation unit, the shutter speed of the CCD camera 54 is set to the lower limit value of the range that can be set for the CCD camera 54. With the time lapse mode set for the observation unit, the LED duty of the LED 61 is set to the upper limit value of the range that can be set for the LED 61. However, the present invention is not limited to this configuration. With the search mode set for the observation unit, the shutter speed of the CCD camera 54 may be set to a value within the predeterminate range which is different from the lower limit value. Furthermore, with the time lapse mode set for the observation unit, the LED duty of the LED 61 may be set to a value within the predetermine range which is different from the upper limit value.

6-2. Modification 2

In the aforementioned embodiment, the predetermined LED duty (in the aforementioned embodiment, the upper limit value of the range that can be set for the LED 61) to be set for the LED 61 when the time lapse mode is set for the observation unit 100 is recorded in the memory 70. Then, when the time lapse operation control unit 72 transmits a luminance control instruction to the luminance control unit 74, that is, when the time lapse mode is set for the observation unit 100, the illuminance control unit 741 sets the LED duty of the LED 61 to the predetermined value recorded in the memory 70. However, the present invention is not limited to this configuration.

The following configuration is possible. The LED duty set for the LED 61 with the search mode set for the observation unit 100 is recorded in the memory 70. When the time lapse operation control unit 72 transmits a luminance control instruction to the luminance control unit 74, the illuminance control unit 741 performs a calculation operation of multiplying the LED duty set with the search mode set for the observation unit and recorded in the memory 70, by a predetermined number larger than 1. Thereafter, the illuminance control unit 741 adjusts and sets the LED duty of the LED 61 to the value calculated by performing the calculation operation.

Figure 16:
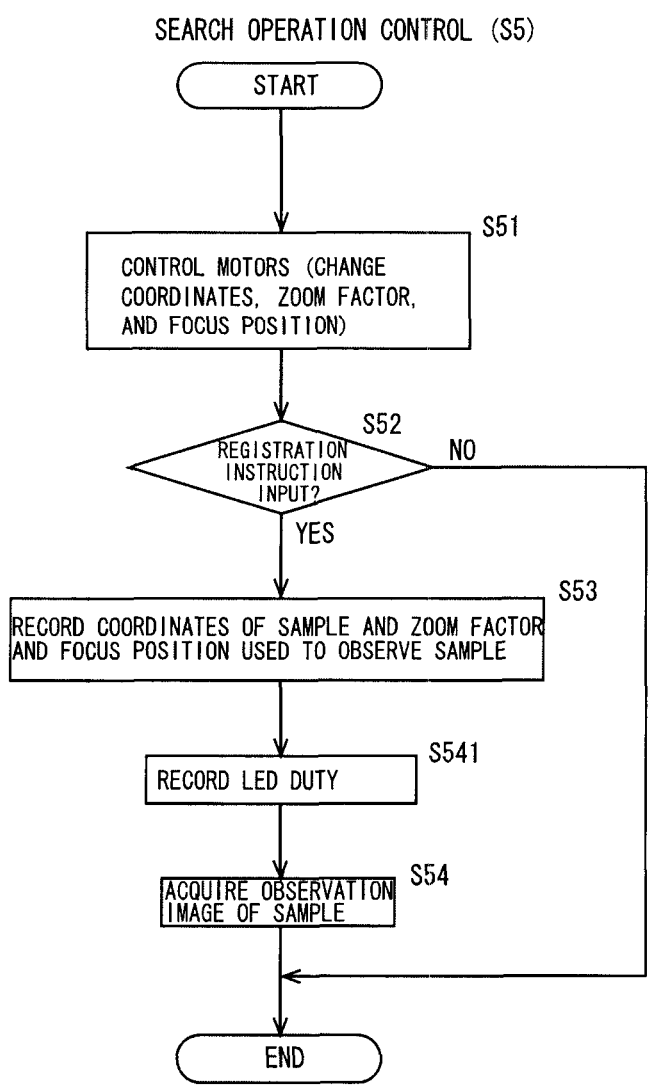
FIG. 16 is a flowchart illustrating a variation of the search operation control procedure.

In the present modification, as illustrated in FIG. 16, the LED duty set with the search mode set for the observation unit is recorded in the memory 70 during the search operation control procedure (step S5) in step S541 set after step S53 and before step S54. The other steps S51 to S54 illustrated in FIG. 16 are as already described.

Furthermore, the calculation operation and the adjustment of the LED duty carried out by the illuminance control unit 741 replace step S21 of the second luminance control procedure (step S64) illustrated in FIG. 14.

If the sample is cells or microorganisms, the sample is cultured and thus grows or multiplies. Thus, when the sample is observed with the time lapse mode set for the observation unit at the same LED duty as that set for the LED 61 with the search mode set for the observation unit, the luminance of observation images acquired by the CCD camera 54 may decrease.

In a control procedure according to the present modification, the LED duty set for the LED 61 with the time lapse mode set for the observation unit is higher than that set for the LED 61 with the search mode set for the observation unit. Hence, a possible decease in the luminance of observation images acquired by the CCD camera 54 is prevented even if the sample grows or multiplies after the sample has been searched for with the search mode set for the observation unit and before the sample is observed with the time lapse mode set for the observation unit.

Furthermore, in the control procedure according to the present modification, the LED duty of the LED 61 can be maintained at the minimum required value when the sample is observed with the time lapse mode set for the observation unit. This enables suppression of a possible increase in the amount of radiation heat and conductive heat transmitted from the illumination device 6 to the sample.

6-3. Modification 3

Instead of Modification 2 described above, Modification 3 described below may be provided. That is, the zoom factor to be set for the zoom lens 53 when the time lapse mode is set for the observation unit 100 is recorded in the memory 70 as the sample information. When the time lapse operation control unit 72 transmits the luminance control instruction to the luminance control unit 74, the illuminance control unit 741 performs the calculation operation of calculating the LED duty to be set for the LED 61 based on the zoom factor recorded in the memory 70. Thereafter, the illuminance control unit 741 may adjust and set the LED duty of the LED 61 to the value calculated by performing the calculation operation. Here, in the calculation operation, the LED duty calculated by the illuminance control unit 741 increases consistently with the zoom factor recorded in the memory 70.

In the present modification, the zoom factor is recorded in the memory 70 in step S53 of the search operation control procedure (step S5) illustrated in FIG. 12. Furthermore, the calculation operation and the adjustment of the LED duty carried out by the illuminance control unit 741 replace step S21 of the second luminance control procedure (step S64) illustrated in FIG. 14.

If the sample is observed at the same LED duty but at different zoom factors, an observation image with a large zoom factor has a lower luminance than an observation image with a small zoom factor. This results in a variation in luminance among observation images.

In the control procedure according to the present modification, the LED duty set with the time lapse mode set for the observation unit is set to a value calculated based on the zoom factor. Thus, even if the zoom factor varies with the sample to be observed, a variation in luminance among observation images acquired by the CCD camera 54 can be reduced.

Furthermore, in the control procedure according to the present modification, when the sample is observed with the time lapse mode set for the observation unit, the LED duty of the LED 61 can be maintained at the minimum required value. This enables suppression of a possible increase in the amount of radiation heat and conductive heat transmitted from the illumination device 6 to the sample.

The configurations of the units according to the present invention are not limited to those described above. Various modifications may be made to the configurations without departing from the technical scope described in the claims. For example, the various configurations adopted for the aforementioned observation system are not limited to observation systems in which the observation unit 100 is used inside the storage 101. The configurations may be applied to observation systems in which the observation unit 100 is used outside the storage 101.

However, the temperature inside the storage 101 is often set to be higher than that outside the storage 101. Thus, when the observation unit 100 is used inside the storage 101, the observation unit 100 generates heat to increase the temperature of the sample based on the temperature inside the storage 101. As a result, the temperature of the sample is likely to rise. Therefore, the present invention is particularly preferably used in observation systems in which the observation unit 100 is used inside the storage 101.

Furthermore, the various configurations adopted for the aforementioned observation system are also applicable to observation systems in which the observation unit 100 lacks the X axis driving unit 1 and/or the Y axis driving unit 3.

What is claimed is:

1. A method for obtaining an observation image of a sample using an observation system, the method comprising steps of:
    (a) preparing the observation system; wherein
    the observation system comprises an observation unit and a computer;
    the observation unit comprises:
        a loading table which a container with a sample accommodated therein is to be loaded;
        an observation device configured to allow the sample to be observed to acquire the observation image of the sample; and
        an illumination device configured to illuminate the sample;
    the computer comprises a memory;
    (b) loading the container with the sample accommodated therein;
    (c1) moving the loading table while the illumination device illuminates the sample, so as to search the sample with the observation unit; wherein
    when a shutter speed of the observation unit is set to a lower limit value of a range that can be set and a luminance of the observation image fails to fall within a predetermined range of values, the shutter speed of the observation unit is not changed and the illumination device adjusts an illuminance of the illumination device,
    (c2) recording the coordinates of the sample which has been searched in the step (c1);
    (d1) moving the loading table on the basis of the coordinate of the sample read from the memory;
    (d2) illuminating the illumination device by the illuminance which is greater than the illuminance configured in the illumination device in the step (c1);
    (d3) conducting auto focus control of the observation device;
    (d4) adjusting the shutter speed of the observation device without changing the illuminance in the illuminating device, when the luminance of the observation device fails to fall within the predetermined range of values;
    (d5) acquiring the observation image of the sample using the observation device; and
    (e) repeating the steps (d1)-(d5), after a predetermined period lapses.

2. The method according to claim 1, wherein
in the step (c2), the zoom factor relevant to the sample which has been searched in the step (c1) is recorded in the memory; and
in the step (d5), the observation image of the sample is acquired on the basis of the zoom factor which has been recorded in the memory.

3. The method according to claim 1, wherein
in the step (c2), the focus position relevant to the sample which has been searched in the step (c1) is recorded in the memory; and
in the step (d5), the observation image of the sample is acquired on the basis of the focus position which has been recorded in the memory.

4. The method according to claim 2, wherein
in the step (c2), the focus position relevant to the sample which has been searched in the step (c1) is recorded in the memory; and
in the step (d5), the observation image of the sample is acquired on the basis of the focus position which has been recorded in the memory.

5. The method according to claim 2, wherein
in the step (d2), the illuminance of the illumination device is adjusted on the basis of the zoom factor which has been recorded in the memory.

6. The method according to claim 1, wherein
in the step (c1), the shutter speed of the observation device is set to the lower limit value of the range that can be set for the observation device.

7. A method for obtaining each observation image of a plurality of samples using an observation system, the method comprising steps of:

(a) preparing the observation system; wherein
the observation system comprises an observation unit and a computer;
the observation unit comprises:
    a loading table which a container with a plurality of samples accommodated therein is to be loaded;
    an observation device configured to allow the sample to be observed to acquire the observation image of the sample; and
    an illumination device configured to illuminate the sample;
the computer comprises a memory;
(b) loading the container with the plurality of the samples accommodated therein;
(c1) moving the loading table while the illumination device illuminates the plurality of the samples, so as to search each sample with the observation unit; wherein
when a shutter speed of the observation unit is set to a lower limit value of a range that can be set and a luminance of the observation image is fail to fall within a predetermined range of the values, the shutter speed of the observation unit is not changed and the illumination device adjusts an illuminance of the illumination device,
(c2) recording the coordinates of each sample which have been searched in the step (c1);
(d1) moving the loading table on the basis of the coordinate of one sample read from the memory;
(d2) illuminating the illumination device by the illuminance which is greater than the illuminance configured in the illumination device in the step (c1);
(d3) conducting auto focus control of the observation device;
(d4) adjusting the shutter speed of the observation device without changing the illuminance in the illuminating device, when the luminance of the observation device fails to fall within the predetermined range of values;
(d5) acquiring the observation image of the one sample using the observation device;
(d6) repeating the steps (d1)-(d5) for each sample; and
(e) repeating the steps (d1)-(d6), after a predetermined period lapses.

8. The method according to claim 7, wherein
in the step (c2), the zoom factor relevant to each sample which has been searched in the step (c1) is recorded in the memory; and
in the step (d5), the observation image of each sample is acquired on the basis of the zoom factor which has been recorded in the memory.

9. The method according to claim 7, wherein
in the step (c2), the focus position relevant to each sample which has been searched in the step (c1) is recorded in the memory; and
in the step (d5), the observation image of each sample is acquired on the basis of the focus position which has been recorded in the memory.

10. The method according to claim 8, wherein
in the step (c2), the focus position relevant to each sample which has been searched in the step (c1) is recorded in the memory; and
in the step (d5), the observation image of each sample is acquired on the basis of the focus position which has been recorded in the memory.

11. The method according to claim 8, wherein
in the step (d2), the illuminance of the illumination device is adjusted on the basis of the zoom factor which has been recorded in the memory.

12. The method according to claim 7, wherein
in the step (c1), the shutter speed of the observation device is set to the lower limit value of the range that can be set for the observation device.

\* \* \* \* \*